(12) United States Patent
Chhaya et al.

(10) Patent No.: US 12,168,325 B2
(45) Date of Patent: Dec. 17, 2024

(54) ARRANGEMENTS FOR FORMING THREE-DIMENSIONAL STRUCTURES, AND RELATED METHODS THEREOF

(71) Applicant: BELLASENO GMBH, Leipzig (DE)

(72) Inventors: Mohit Prashant Chhaya, Leipzig (DE); Navid Khani, Leipzig (DE); Jonas Alexander Thiele, Wuerzburg (DE)

(73) Assignee: BELLASENO GMBH, Leipzig (DE)

( * ) Notice: Subject to any disclaimer, the term of this patent is extended or adjusted under 35 U.S.C. 154(b) by 314 days.

(21) Appl. No.: 17/759,748

(22) PCT Filed: Feb. 3, 2021

(86) PCT No.: PCT/EP2021/052513
§ 371 (c)(1),
(2) Date: Jul. 29, 2022

(87) PCT Pub. No.: WO2021/156292
PCT Pub. Date: Aug. 12, 2021

(65) Prior Publication Data
US 2023/0073418 A1    Mar. 9, 2023

(30) Foreign Application Priority Data

Feb. 3, 2020  (EP) .................................. 20155109

(51) Int. Cl.
*B29C 64/393*    (2017.01)
*B29C 64/118*    (2017.01)
(Continued)

(52) U.S. Cl.
CPC .......... *B29C 64/393* (2017.08); *B29C 64/118* (2017.08); *B29C 64/386* (2017.08);
(Continued)

(58) Field of Classification Search
CPC ..... B29C 64/386; B29C 64/393; B33Y 50/00; B33Y 50/02
See application file for complete search history.

(56) References Cited

U.S. PATENT DOCUMENTS

| 2018/0009169 A1 | 1/2018 | Inoue |
| 2018/0111321 A1 | 4/2018 | Herzog |
| 2020/0238625 A1* | 7/2020 | Champion .............. B29C 64/10 |

FOREIGN PATENT DOCUMENTS

WO    WO-2021054894 A1 *   3/2021

OTHER PUBLICATIONS

Delli Ugandhar et al, "Automated Process Monitoring in 3D Printing Using Supervised Machine Learning", Procedia Manufacturing, 43rd North American Manufacturing Research Conference, NAMRC 43, Jun. 8-12, 2015, UNC Charlotte, North Carolina, United States, (Jan. 1, 2018), vol. 26, doi:10.1016/j.promfg.2018.07.111, ISSN 2351-9789, pp. 865-870, XP055806871.

* cited by examiner

*Primary Examiner* — Atul P. Khare
(74) *Attorney, Agent, or Firm* — Riverside Law LLP

(57) ABSTRACT

Embodiments relate to a method for forming a three-dimensional structure. The method includes determining one or more locations for positioning a sensing device based on structural coordinate information relating to a three-dimensional structure to be formed. The method further includes forming a portion of the three-dimensional structure based on the structural coordinate information. The method further includes positioning the sensing device at a location of the one or more locations.

20 Claims, 25 Drawing Sheets

(51) Int. Cl.
*B29C 64/386* (2017.01)
*B33Y 10/00* (2015.01)
*B33Y 50/00* (2015.01)
*B33Y 50/02* (2015.01)

(52) U.S. Cl.
CPC ............... *B33Y 10/00* (2014.12); *B33Y 50/00* (2014.12); *B33Y 50/02* (2014.12)

ARRANGEMENTS FOR FORMING THREE-DIMENSIONAL STRUCTURES, AND RELATED METHODS THEREOF

CROSS-REFERENCE TO RELATED APPLICATIONS

This application is a U.S. national phase application filed under 35 U.S.C. § 371 claiming benefit to International Patent Application No. PCT/EP2021/052513, filed Feb. 3, 2021, which is entitled to priority of European Patent Application No. 20155109.0, filed Feb. 3, 2020, the disclosures of which are incorporated herein by reference in their entirety.

FIELD OF THE INVENTION

The embodiments described herein relate to arrangements for forming three-dimensional structures, and related methods thereof.

BACKGROUND

The manufacturing of three-dimensional structures may be monitored using indirect measurements or direct measurements of printing errors. Indirect measurements measure printing parameters as well as environmental variables, whereas direct measurements monitor the printed structures themselves for defects. For example, in fused deposition modelling (FDM) printing, various sensors may be used for indirect measurements, since many measurable variables may represent the printing status. For example, acoustic emission (AE) techniques may be used to determine abnormal printing states and to detect filament breakage. In some applications, hidden semi-Markov Models and k-Means Clustering may be used to differentiate between printing states. In some applications, nozzle clog monitoring may be implemented. In some applications, a material deposition status may be determined by measuring the current of a filament feed motor. In some applications, a two-dimensional laser triangulation system may be used to scan the dimensions of extruded tracks. In some applications ultrasonic excitation may be used to detect bonding failures while printing. In some applications, Fiber Bragg Grating sensors and thermocouples may be embedded inside specimens to monitor generated residual strains and temperature profiles while printing. The thermocouples may be used to evaluate temperature conditions during the printing process. In some applications, it may be possible to reconstruct a temperature field of a fused filament fabricated specimen using measurements of four temperature readings at one time step by applying compressive sensing. In some applications, sensor arrays with multiple sensors may monitor the printing process. A classification of different process states (normal operation, abnormal operation and build failures) may be carried out by analysing sensor data using a Nonparametric Bayesian Model.

For direct measurements, an image of the printed model may be compared with a CAD model by using an augmented reality-based technique. In some applications, a single and a double camera system may be used for the detection of clogged nozzles, incomplete projects and the loss of filaments. In some applications, three-dimensional images of printing parts may be reconstructed using two cameras to find differences between the point cloud of the ideal model and the printed part. In some applications, a printed part may be imaged with a two-dimensional camera. The center of the printed part may be detected and compared with the center of the ideal geometry. In some applications, a border signature method may be applied to detect geometry deviations in outer geometry of simple solids, comparing an ideal profile and printed part profile layer-wise. In some applications, slippage using a USB microscope video camera may be measured and controlled.

Online inspecting approaches may be used in other printing techniques. For example, computerized tomography (CT) scans of a metal-based powder-bed fusion manufactured part may be made and the two-dimensional image of every layer may be analyzed by multifractal analysis. In some applications, fringe projection may be used to measure surface topography of AM manufactured parts. Furthermore, online signature analysis may be carried out on layers of ceramic sensors. In some applications, signatures of extruded tracks with template signatures may be compared to detect defects. In some applications, to image errors in selective laser melting, a change of intensity of single pixels may be captured in consecutive images from a video frame by statistical methods to detect pixels that have abnormal intensity profiles over time. Additionally, it may be possible to recognize singular points of a printing part or of labels that are printed on the printing object to capture the appearance of additively manufactured parts.

SUMMARY OF THE INVENTION

Various embodiments relate to providing methods and arrangements for monitoring the quality of three-dimensional structures during the manufacturing process. The methods and arrangements provide an improved process for classifying and localizing defects and their sources during printing.

Various embodiments relate to a method for forming a three-dimensional structure. The method includes determining one or more locations for positioning a sensing device based on structural coordinate information relating to a three-dimensional structure to be formed. The method further includes forming a portion of the three-dimensional structure based on the structural coordinate information. The method further includes positioning the sensing device at a location of the one or more locations.

Various embodiments relate to an arrangement for forming a three-dimensional structure. The arrangement includes a forming device for forming a three-dimensional structure based on structural coordinate information relating the three-dimensional structure. The arrangement further includes a moveable sensing device. The arrangement further includes a processor, wherein the processor is configured to determine one or more locations for positioning the sensing device based on structural coordinate information relating to a three-dimensional structure to be formed, and to control a positioning of the moveable sensing device to the one or more locations.

Various embodiments relate to an arrangement for forming a three-dimensional structure. The arrangement includes a forming device for forming a three-dimensional structure including a plurality of layers. The arrangement further includes a moveable sensing device. The arrangement further includes a processor configured to determine, for a layer set of the plurality of layers, at least one location for positioning the sensing device. The processor is further configured to control a forming of the layer set by the device based on structural coordinate information relating to the three-dimensional structure. The processor is further configured to control a positioning of the moveable sensing device to at least one location associated with the layer set, after the layer set is formed and before a further layer set is formed. The processor is further configured to determine a process status based on acquired structural data of the formed layer set, wherein the acquired structural data is acquired by the sensing device at the at least one location associated with the formed layer set.

BRIEF DESCRIPTION OF THE DRAWINGS

The foregoing and other features of the present disclosure will become more fully apparent from the following description and appended claims, taken in conjunction with the accompanying drawings. It is understood that the accompanying drawings depict only several embodiments in accordance with the present disclosure and are, therefore, not to be considered limiting of its scope. The disclosure will be described with additional specificity and detail through use of the accompanying drawings, such that the advantages of the present disclosure can be more readily ascertained, in which:

DETAILED DESCRIPTION

Figure 1A:
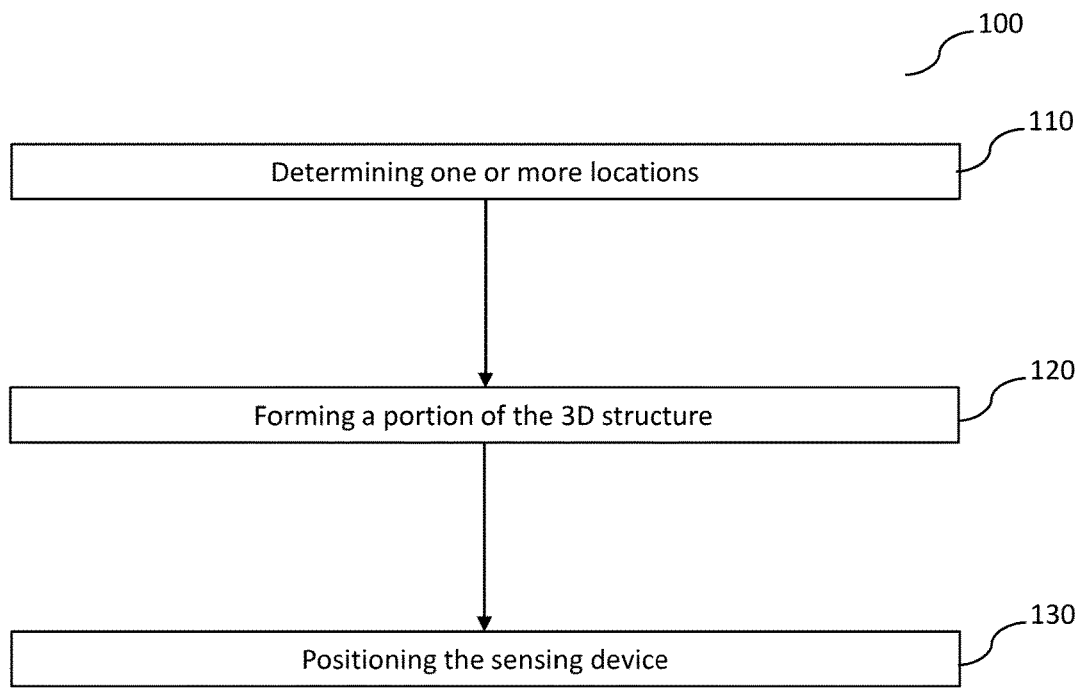
FIG. 1A shows a flow chart of a method 100 for forming a three-dimensional structure.

In the following detailed description, reference is made to the accompanying drawings that show, by way of illustration, specific embodiments in which the claimed subject matter may be practiced. These embodiments are described in sufficient detail to enable those skilled in the art to practice the subject matter. It is to be understood that the various embodiments, although different, are not necessarily mutually exclusive. The terms "embodiment," "example embodiment," "exemplary embodiment," and "present embodiment" do not necessarily refer to a single embodiment, although they may, and various example embodiments may be readily combined and/or interchanged without departing from the scope or spirit of example embodiments. For example, a particular feature, structure, or characteristic described herein, in connection with one embodiment, may be implemented within other embodiments without departing from the spirit and scope of the claimed subject matter. References within this specification to "one embodiment" or "an embodiment" mean that a particular feature, structure, or characteristic described in connection with the embodiment is included in at least one implementation encompassed within the present description. Therefore, the use of the phrase "one embodiment" or "in an embodiment" does not necessarily refer to the same embodiment. In addition, it is to be understood that the location or arrangement of individual elements within each disclosed embodiment may be modified without departing from the spirit and scope of the claimed subject matter. The following detailed description is, therefore, not to be taken in a limiting sense, and the scope of the subject matter is defined only by the appended claims, appropriately interpreted, along with the full range of equivalents to which the appended claims are entitled. In the drawings, like numerals refer to the same or similar elements or functionality throughout the several views, and that elements depicted therein are not necessarily to scale with one another, rather individual elements may be enlarged or reduced in order to more easily comprehend the elements in the context of the present description.

The terms "over", "to", "between" and "on" as used herein may refer to a relative position of one layer with respect to other layers. One layer "over" or "on" another layer may be directly in contact with the other layer or may have one or more intervening layers. One layer "between" layers may be directly in contact with the layers or may have one or more intervening layers.

The terms "a," "an," and "the" may include singular and plural references. Furthermore, as used in the present disclosure and the appended claims, the words "and/or" may refer to and encompass any and all possible combinations of one or more of the associated listed items. As used in the present disclosure, the phrase "A and/or B" means (A), (B), or (A and B). As used in the present disclosure, the phrase "A, B, and/or C" means (A), (B), (C), (A and B), (A and C), (B and C), or (A, B and C). As used in the present disclosure, term "or" when used in the phrase "A, B, or C" means that (A) does not exclude (B) and (C), (B) does not exclude (A) and (C), and (C) does not exclude (A) and (B).

FIG. 1A shows a flow chart of a method 100 for forming a three-dimensional structure.

The method 100 includes determining 110 one or more locations for positioning a sensing device based on structural coordinate information relating to a three-dimensional structure to be formed. The method 100 further includes forming 120 a portion of the three-dimensional structure based on the structural coordinate information. The method 100 further includes positioning 130 the sensing device at a location of the one or more locations.

The structural coordinate information may include or may be coordinate information relating to a layout of the three-dimensional structure to be formed. The structural coordinate information may include coordinate information relating to a location, a position, an orientation, a dimension, shape and/or form of the physical structure and/or layout of the three-dimensional structure to be formed. The structural coordinate information may be information based on a coordinate system, that uses numbers of a scale or axis to uniquely define and/or describe the location, position, orientation, dimension, shape and/or form of structural features of the three-dimensional structure to be formed. Optionally, the structural coordinate information may be based on a three-dimensional cartesian coordinate system with three mutually perpendicular axes (e.g. an x-axis, a y-axis and a z-axis) and three mutually orthogonal planes. The structural coordinate information may include information with respect to the internal structure and/or external structure of the three-dimensional structure to be printed with respect to the three-dimensional cartesian coordinate system. Alternatively, the structural coordinate information may be based on any other coordinate system, such as a spherical, polar, elliptic or cylindrical coordinate system, or any coordinate systems whose coordinates may be transformed between the said coordinate systems and a cartesian coordinate system.

The structural coordinate information may include (or may be) computer-aided design (CAD) information relating to the architecture, mapping, form or layout of the three-dimensional structure. Additionally, alternatively or optionally, the structural coordinate information may include computer-aided manufacturing (CAM) information for controlling a forming device (e.g. a three-dimensional printing device or arrangement) for forming the three-dimensional structure. Additionally, alternatively or optionally, the structural coordinate information may include (or may be) toolpath instructions for controlling a forming device for forming the three-dimensional structure. For example, the structural coordinate information may include (or may be) numerical code instructions, such as G-code instructions. Numerical code toolpath instructions and/or G-code instructions may be based on and/or may include coordinate information relating to the structure and/or architecture of the three-dimensional structure to be formed. Such instructions, when executed by a processor, may control a movement and/or path of a device (e.g. a dispensing device) for forming the three-dimensional structure.

The structural coordinate information may include information related to an internal structure and/or external structure of the three-dimensional structure. The three-dimensional structure to be formed may include but is not limited to including three-dimensional scaffold structures and/or mesh structures, for example. Alternatively, additionally or optionally, the three-dimensional structure may include infill lines (also referred to herein as strands), or may be any structure including a lattice network of strands or lines. Besides infill lines, the strands may also include outfill lines, which form the outer boundary of the structure.

A three-dimensional structure to be formed (such as a scaffold structure and/or mesh structure) may include a plurality of layers or a plurality of layer sets. In (or during) the three-dimensional forming (or printing) processes, the three-dimensional structure may be formed by forming a first layer, followed by forming layers consecutively on top of each other so that the consecutive layers are stacked vertically with respect to each other in a print direction (which may be referred to herein as the z-direction). Optionally, such a printed layer may be understood to be or may be referred to as a lateral layer, a horizontal layer, a planar layer or a flat layer. By these terms, the layer is understood to be a layer lying in or within an x-y plane. Such a printed layer may have dimensions extending along the x-axis (x-direction) and along the y-axis (y-direction) which are larger (e.g. at least 10 times, or e.g. at least 50 times, or e.g. at least 100 times) larger than its dimensions in the z-direction. It may be understood that the terms lateral layer and horizontal layer used herein may refer to a direction perpendicular to the print direction, which may be considered to be the z-direction or a vertical direction. Once the printing of one lateral (or horizontal) layer is complete, the printer may then proceed to print a successive lateral (or horizontal) layer on top of (or e.g. above, or e.g. on, or e.g. over) the previous layer resulting in lateral layers stacked vertically with respect to each other (e.g. vertically stacked) in the print direction (e.g. in the case of three-dimensional printing). Optionally, a layer set (or layer) may include a first sub-layer (or a first group of sub-layers) of strands oriented in a first direction and a second sub-layer of strands oriented in a second direction different to the first direction. Optionally, a layer set is not limited to including only a first group of sub-layers or a second group of sublayers, but may including any possible number of sub-layers. Each group of sub-layers may include (or may refer to) one or more sub-layers. Optionally, the intersecting (or e.g. criss-crossing) lines or strands may form a plurality of repeated unit cells of a layer set.

The external structure of the three-dimensional structure may be an outer surface region of the three-dimensional structure. An outer surface region may refer to (or may be) an outermost surface, an outermost layer, and/or an outermost contour of the three-dimensional structure. An outermost surface and outermost contour may be formed from one or more layers or strands. An outer surface region may refer to (or may be) an outermost group of layers (e.g. a single outermost layer, or e.g. an outermost plurality of layers, or e.g. a boundary layer) of the three-dimensional structure. An outer surface region may refer to an exterior (or e.g. outward) facing surface of the three-dimensional structure.

An internal structure of the three-dimensional structure may be any portion of the three-dimensional structure that is not at the outermost boundary of the three-dimensional structure. Additionally, alternatively, or optionally, a unit cell that is surrounded on all of its sides by other unit cells within a layer set may be considered to be an internal structure of three-dimensional structure. To the contrary, a boundary unit cell that may include at least one side that is not surrounded by another unit cell may be considered part of an external structure of the three-dimensional structure. An internal structure of the three-dimensional structure may be any portion of the three-dimensional structure located more than two times a desired strand width or thickness of the printed strands from an outermost surface. The desired strand width or thickness may be an ideal thickness of the strands of the three-dimensional structure to be printed, for example. Optionally, an average thickness (or width, or diameter) of a strand may be, but is not limited to being, between 0.001 mm and 30 mm (or e.g. between 0.001 mm to 1 mm, or e.g. between 0.01 mm and 0.5 mm). Optionally, a separation distance between neighboring lines may be, but is not limited to being, between 0.001 mm and 30 cm (or e.g. between 0.001 mm and 50 mm, or e.g. between 0.01 mm and 50 mm). Similarly, each sublayer oriented in the second direction may be separated from an adjacent (or successive) sublayer oriented in the (same) second direction by a separation distance of between 1% to 100% of the average thickness of a strand.

Figure 2A:
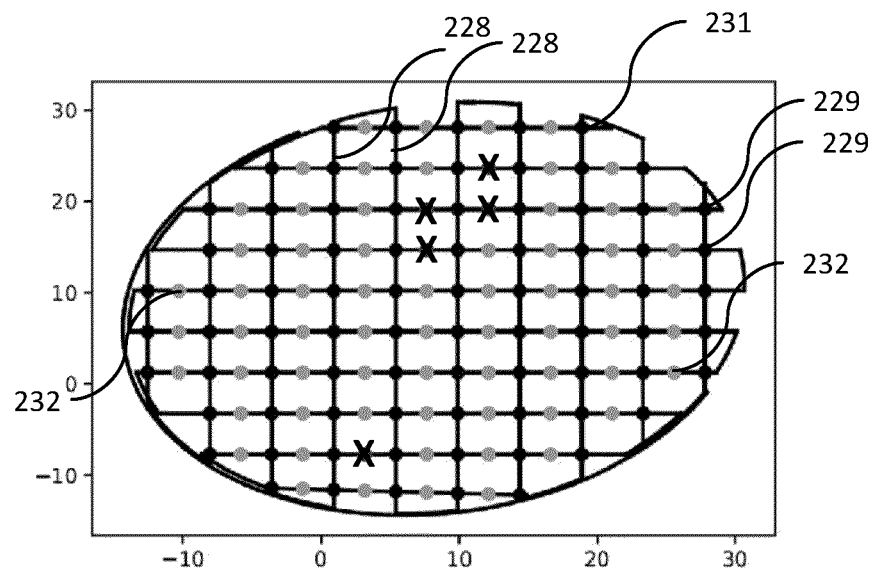
FIGS. 2A and 2B each show examples of different layer sets of the three-dimensional structure.
Figure 2B:
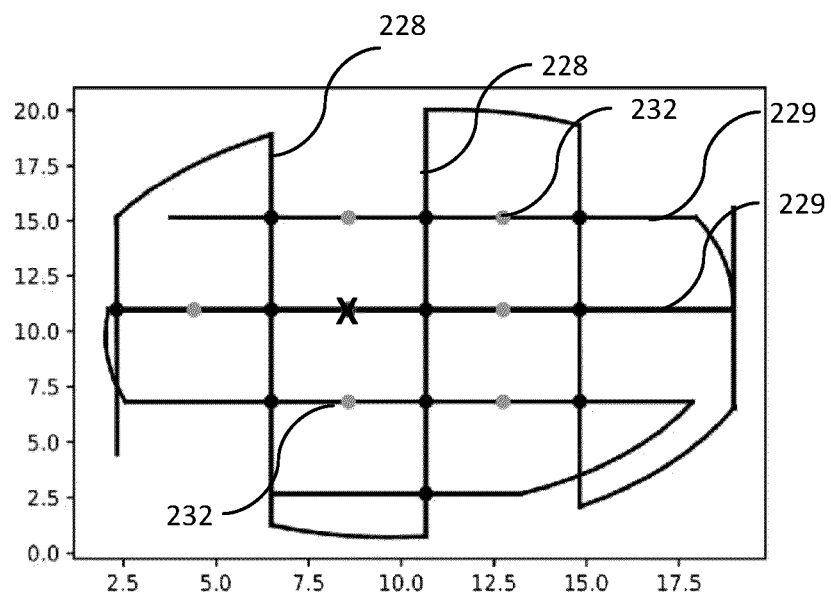

The method 100 includes determining one or more locations (or e.g. a plurality of locations) for positioning the sensing device based on the structural coordinate information relating to the three-dimensional structure to be formed. A processor may be configured to determine (or calculate) the one or more locations from or based on the structural coordinate information. The one or more locations may be determined from the structural coordinate information by calculating or determining intersection regions or intersection points between strands (or strand segments) of the three-dimensional structure, for example (as shown in FIGS. 2A to 2B).

Forming 120 the portion of the three-dimensional structure may include printing the portion of the three-dimensional structure by a three-dimensional printing device or arrangement. The three-dimensional structure may be formed by a three-dimensional (3D) printing process. A three-dimensional printing process may include at least one of stereolithography (SLA), digital light processing (DLP), fused deposition modeling (FDM), selective laser sintering (SLS), selective laser melting (SLM), electronic beam melting (EBM), laminated object manufacturing (LOM), binder jetting (BJ), and material jetting (MJ). The processor may execute numerical code instructions based on the structural coordinate information to control a movement and/or path of at least part of a forming device for forming the three-dimensional structure. In some examples, the portion of the device whose movement is controlled by the structural coordinate information may be a dispensing portion for dispensing print material for forming the three-dimensional structure (e.g. the strands of the three-dimensional structure) such as in fused deposition modelling. In other examples, the controlled portion of the device may be a laser, wherein the structural coordinate information controls the selective locations at which at least one of sintering, hardening, melting, binding, laminating and/or curing of material for forming the three-dimensional structure may occur. It may be understood that the portion of the device whose movement is controlled by the numerical code instructions may be the portion of the device responsible for the forming of the three-dimensional structure (e.g. for the forming of strands of the three-dimensional structure) at the selected locations defined by the structural coordinate information of the numerical code instructions. Alternatively or optionally, the three-dimensional structure may be formed by a printing process based on more than three dimensions of movement, e.g. a five-dimensional (5D) printing process, or a six-dimensional (6D) printing process.

Since the method 100 relates to an in-situ monitoring process, it may be understood that the formed portion (formed in 120) referred to herein may be less than the entire three-dimensional structure to be formed. For example, the portion of the three-dimensional structure may be a layer set (e.g. one, or e.g. more than one layer set) of a plurality of layers (and/or layer sets) of the three-dimensional structure. The formed portion may be or may include an internal structure of the three-dimensional structure. For example, the formed portion may include one or more layer sets including a plurality of intersecting lines or strands forming a lattice of unit cells within the three-dimensional structure. A process for defect detection for a plurality of layers is further described in connection with FIG. 1B.

The method 100 may include determining a group of locations for positioning the sensing device related to the formed portion of the three-dimensional structure before starting the forming process, or even during the forming process. For example, the group of locations may be determined before or after forming the portion of the three-dimensional structure. The method 100 may include sequentially positioning the sensing device at the locations of the group of determined locations related to the already formed portion before forming a further (or e.g. subsequent) portion of the three-dimensional structure. The group of locations may include a number of locations. The number of locations may be random, sequential, array-based, and/or determinable by a user. The group of locations may refer to (or may be, or may include) one or more (e.g. a plurality) of locations.

At the individual locations (e.g. at each location) of the group of locations, the method 100 may include acquiring data of at least part of the formed portion by the sensing device. The sensing device may be any sensing device that may acquire data including structural information of the formed portion. For example, the sensing device may be at least one device from the group of the devices, the group of devices consisting of: an imaging device, a camera, a thermal camera, a microscope, a laser scanner, and a three-dimensional scanning device. Optionally, the acquired data may be a two-dimensional image or a three-dimensional image of the formed portion acquired at the respective locations of the group of locations.

The acquired data may include visual data, which may include or may be structural information related to and/or about one or more structural features of the formed portion of the three-dimensional structure. Structural information acquired and/or determined from the acquired data may include information related to the location, a position, an orientation, a dimension, shape and/or form of a physical structural feature and/or layout of the formed portion of the three-dimensional structure. For example, a structural feature may be a line, a line segment, a strand, a strand segment, a pore and/or a wall of the formed portion of the three-dimensional structure.

Additionally or optionally, the method 100 may further include determining a process status based on the acquired data relating to at least part of the formed portion of the three-dimensional structure. The process status may be determined after acquiring data related to the formed portion (e.g. a layer set) and (optionally) before forming a further portion (e.g. a further layer set) of the three-dimensional structure. The further portion referred to herein may be, but is not limited to being the directly subsequent portion to be formed. For example, the forming device may continue the printing process until the process status is determined, which depending on the time needed to determine the process status, may mean that one or more further portions of the three-dimensional structure may have already been printed.

Determining the process status may include determining a parameter value of a structural feature of the formed portion of the three-dimensional structure based on the acquired data. The parameter value of the structural feature may be at least one of a length, width or diameter, height, roughness, color, homogeneity, thickness and tilt angle of the structural feature of the formed portion of the three-dimensional structure. Optionally, the parameter value of the structural feature may be determined based on an edge detection of the strand segment (e.g. by detecting edges of the strand segment). For example, the parameter value may be a width of the strand segment between two detected edges of the strand segment. The edges of the strand segment may be detected by implementing an artificial neural network process or a gradient-based detection process, for example. Optionally, the parameter value of the structural feature may be determined based on a difference between the structural feature and a given baseline or comparative structure (e.g. by subtracting image values) and/or by determining a misalignment between the structural feature and a given baseline or comparative structure.

Optionally, determining the process status may include determining (e.g. calculating, or e.g. generating), based on the structural coordinate information, an ideal axis of a strand segment of the portion of the three-dimensional structure. Determining the process status may further include determining (e.g. measuring, or e.g. calculating), based on the acquired data of the formed portion, an actual axis of a strand segment of the formed portion. The process status may be determined based on a comparison between the ideal axis and the actual axis. A defective process status may be determined if a difference between the ideal axis and the actual axis exceeds a threshold.

Optionally, determining the process status may include comparing an ideal parameter value of a strand segment of the portion of the three-dimensional structure and a determined parameter value of a strand segment of the formed portion. The determined parameter value of the strand segment may be determined based on the acquired data of at least part of the formed portion of the three-dimensional structure. The ideal parameter value of the strand segment may be determined based on at least one of the structural coordinate information and an input value. The input value may be one or more user input values and/or one or more values of a data set or database (e.g. a collection of data over several prints or of former processes). A defective process status may be determined if a difference between the ideal parameter value and the determined parameter value exceeds a threshold.

Additionally, optionally or alternatively, determining the process status may include determining a plurality of parameter values associated with a plurality of strand segments of the formed portion. A statistical parameter (e.g. at least one of a standard deviation, a variance, a median, a mode, a range, correlation, frequency, maximum, minimum, a quartile, a mean and an error) of the plurality of parameter values may be determined. A defective process status may be determined if a difference between the statistical parameter and a comparative parameter exceeds a threshold.

The method 100 may further include adapting process parameters for forming the three-dimensional structure based on the determined process status. The process parameters may include at least one process parameter of the group consisting of: forming temperature, ambient temperature, a cooling process, layer clearance, nozzle cleanliness, flow rate of printing material, printing speed, toolpath, and ambient humidity and/or laser power. The ambient temperature may be a room temperature and/or a chamber temperature or a temperature of an enclosed space in which forming of the three-dimensional structure is carried out. The forming temperature (e.g. a printing temperature) may be a temperature of a cartridge holding a material (e.g. a polymer) for forming the three-dimensional structure to be dispensed. The laser power may be the power and/or energy of a laser for sintering, hardening, melting, binding, laminating and/or curing of material forming the three-dimensional structure.

Figure 1B:
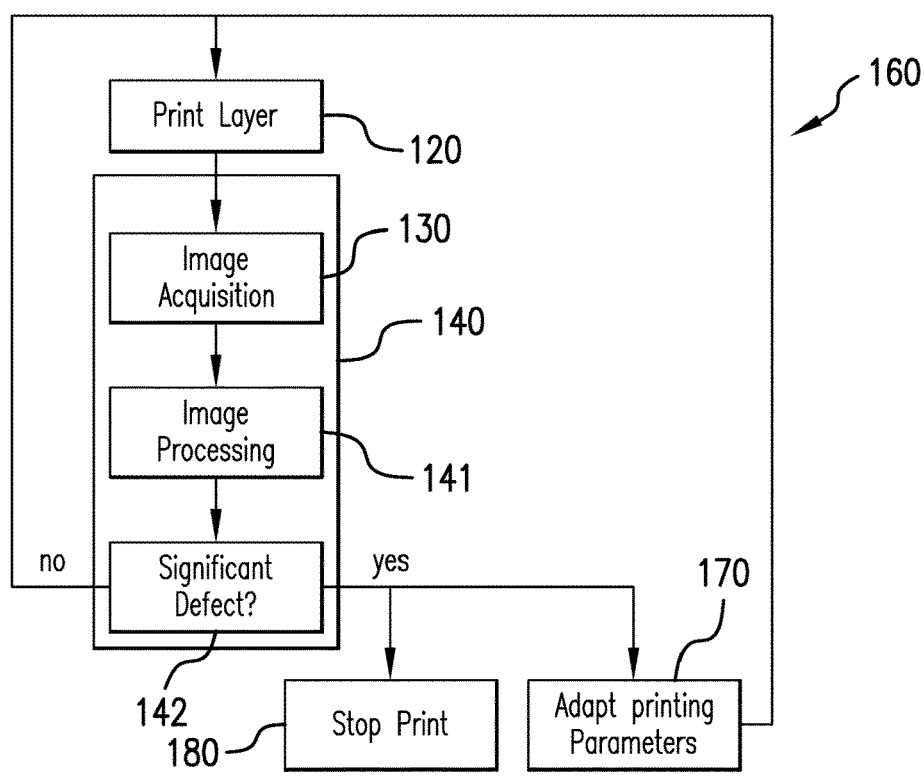
FIG. 1B shows a flow chart of a method 160 for forming a three-dimensional structure.

FIG. 1B shows a flow chart of a method 160 for forming a three-dimensional structure. The method 160 may include one or more or all of the features already described in connection with FIG. 1A. FIG. 1B shows a process of a defect detection system, and how in-situ monitoring of the process for forming the three-dimensional structure may be implemented.

As described in connection with FIG. 1A, the method 160 may include determining, for a layer set (or e.g. for each layer set) of a plurality of layers of the three-dimensional structure to be printed, a respective group of locations for positioning the sensing device. The group of locations may be determined based on structural coordination information of the three-dimensional structure to be printed, and the group of locations may optionally be determined before starting the forming process (e.g. the printing process) of the three-dimensional structure. Alternatively, a processor may be configured to determine the group of locations during the printing process, so long as the group of locations for a respective portion of the three-dimensional structure is determined, before or by the time that respective portion has begun to be formed, or alternatively has been fully formed. Optionally, or alternatively, the processor may even be configured to determine the group of locations for the respective portion after the respective portion has been formed.

The method 160 may further include generating adapted numerical code instructions for forming the three-dimensional structure. For example, the adapted numerical code instructions may include instructions for controlling a movement of the forming device and a movement of the moveable sensing device. The adapted numerical code instructions may include the structural coordinate information relating to the three-dimensional structure to be formed and information related to the positioning of the sensing device at the one or more locations. For example, the information related to the positioning of the sensing device may be information for controlling the positioning or movement of the moveable sensing device to the one or more locations. Furthermore, the adapted numerical code instructions may adapt the timing sequence or movement sequence of the forming device to take into account the movement of the moveable sensing device to the one or more locations.

By a processor executing the adapted numerical code instructions, the method 160 may include forming 120 a portion of the three-dimensional structure based on the structural coordinate information (as described in connection with method 100). Forming 120 the portion of the three-dimensional structure may include or may mean forming (e.g. printing) a layer set (e.g. a first layer set, or e.g. an arbitrary first layer set) of the plurality of layer sets.

After forming the (first) layer set and before forming a further (or e.g. subsequent, e.g. a second or e.g. an arbitrary second) layer set, the method 160 may include determining 140 a process status (e.g. a manufacturing status) of the forming of the three-dimensional structure. Determining 140 the process status may include sequentially positioning the sensing device at the locations of the group of locations determined for the formed layer set. Determining 140 the process status 140 may further include acquiring data 130 (e.g. by image acquisition) related to the formed layer set at each location of the group of locations determined for the formed layer set. Determining 140 the process status may further include processing 141 the acquired data (e.g. by processing each acquired image).

Determining 140 the process status may include determining 142 a defective process status (e.g. determining if a significant printing defect has occurred) based on a comparison between ideal parameter values and acquired parameter values. If the processor determines a defective process status, the processor may execute instructions to stop 180 the forming process or to adapt 170 the printing parameters. If a defective process status is not determined the processor executes instructions to continue the forming process and the next layer set may be printed.

The method 160 may include repeatedly alternatingly between forming a layer set (or one or more layers sets) of the plurality of layer sets, and after forming the layer set and before forming a further layer set, sequentially determining the process status (which may include positioning the sensing device at the locations of the group of locations of the formed layer set). Optionally, the latter repeatedly alternating process may be carried out until the printing process is complete and the three-dimensional structure is formed, or alternatively, until a significant defect is determined which causes the processor to execute instructions to stop the printing. Optionally, the repeatedly alternating process may be carried out up until a specific (e.g. a predefined portion) of the three-dimensional structure has been printed, even if no defects are determined Such a predefined portion may be a specified or certain number of layers within the total number of layers of a structure, or may be a specified or specific location or portion within the three-dimensional structure. Such a predefined portion may be portion of the three-dimensional structure with more complexity, or less complexity than other portions of the three-dimensional structure, and may be selected according to the requirements of the manufacturing process.

A sensing device (e.g. a commercial digital microscope) may be used to capture the images (pictures) of areas of interest in a layer-wise manner. These images may be processed for detecting defects. FIG. 1B shows the layer-wise characteristic of the detection method 160. After each printed layer, the microscope may be automatically positioned by the printer's axes above the specified area of interest. Depending on the field of view and the size of the monitored feature, the one or more images may be taken and processed. For the automation of camera positioning and image taking, the time of the image taking and the optimal camera position may need to be known. This information may be extracted from the numerical code (e.g. G-Code), which includes all printer movements used to print the three-dimensional scaffold structure. The numerical code may be modified or adapted or used to determine potential camera positions and modified with commands for the camera positioning. Optionally, the sensing device may be arranged on a separate or different axes system from the printing device (e.g. the printing head). It may be possible that the adapted numerical code is used to control two separate axes systems, namely the sensing device axes system, and the print device axes system. For example, the adapted numerical code may be sent to a plurality of different processors or controllers, each controlling a different axes system.

The subsequent image processing may be used for the measurement of strand diameters. If the measurements are within a predetermined tolerance, the print may be continued. In case of significant deviations, the print may be stopped 180. In case of deviations within a predetermined tolerance, (e.g. deviations which are not big enough to stop the print but may be prevented in the following layers), printing parameters may be adjusted 170. After the adjustment 170, the printing process may proceed. The methods 100 and 160 may be used for the detection of strand diameters, and additionally, alternatively, or optionally, for the detection of fractures or geometrical deviations, for example.

FIGS. 2A and 2B each show examples of different layer sets described with respect to the methods of FIGS. 1A to 1B.

FIGS. 2A to 2B show an illustration of a layer set of unit cells. The layer set may include a first sub-layer (or a first group of sub-layers) including strands 228 oriented in a first direction, and a second sub-layer (or second group of sub-layers) including strands 229 oriented in a second direction different to the first direction.

Optionally, the strands of each sub-layer may be part of a continuous sub-layer strand extending continuously from a start point, S, of the sub-layer to an end point, E, of the sub-layer. For example, the strands 228 of first sub-layer may be part of a continuous sub-layer strand meandering continuously from the start point, S, to the end point, E, of the first sub-layer. For example, the strands of the second sub-layer may be part of a continuous sub-layer strand meandering continuously from the start point, S, to the end point, E, of the second sub-layer. It may be understood that where the terms line or strands are used herein, they may include or refer to not only straight lines, but also curves, or free-form strands. For example, the intersecting strands forming a unit cell may be straight lines, or alternatively, the strands may be sinusoidal lines or curved, wherein the unit cells may have a "free-form" shape. Alternatively, or optionally, the layers may be printed as paths with more than one start and end point. For example, there may be gaps in between each layer, or a layer may include different regions or the layer may include different structures that are formed at the same time.

Optionally, some of the strands 228, 229 within each respective sub-layer may be parallel to each other (e.g. an acute angle between the strands within a sub-layer, or between the strand of best fit for sinusoidal strands, may lie within +/−5°). Alternatively, the strands may be curves or may extend in random directions without being parallel to each other.

Optionally, the plurality of strands 228 of the first sub-layer and the plurality of strands 229 of the second sub-layer may intersect at intersection points or intersection regions to form a two-dimensional lattice arrangement of two-dimensional unit cells of the layer. The two-dimensional unit cells of each layer of the stacked layer arrangement may form the three-dimensional lattice structure. Each unit cell of a layer set may include or may be formed from intersecting strands 228, 229 from adjacent sub-layers defining a pore size of the unit cell. For example, two adjacent (and parallel) strands 228 of a first sub-layer may intersect with two adjacent (and parallel) strands 229 of a second (adjacent) sub-layer. The area of a unit cell enclosed by the intersecting strands may be rhomboid unit cells, polygonal unit cells, triangular-shaped unit cells, diamond-shaped unit cells, free-form shaped unit cells, square-shaped unit cells, parallelogram-shaped unit cells and/or hexagonal-shaped unit cells.

A layer set may include at least a first sub-layer and at least a second sub-layer. The locations of the plurality of locations may be determined from the structural coordinate information based on intersection points 231 between the first sub-layer and the second sub-layer (e.g. crossing points between the strands 228 of the first sub-layer and the strands 229 of the second sub-layer). For example, the locations 232 of the plurality of locations 232 may be between two intersection points 231 of the first sub-layer and the second sub-layer.

The printing process (e.g. an FDM process) may follow a layer-wise approach. The structure of a scaffold S may be represented by a set of layers L:

$$S=\{L^j\}_{j=1,\ldots,J}$$

where J is the total number of layers with j∈ℕ. Every movement of the printer may be defined by the numerical code instructions (e.g. G-Code) with a start point and an end point, wherein the printing head may move in straight lines. Circular movements may be approximated by consecutive lines of a short length. Thus, each layer $L^j$ may be defined as a set of lines 1:

$$L^j = \{l_g^j\}_{g=1,\ldots,G}$$

The total number of lines in a layer is G with g ∈ ℕ. Every line $l_g^j$ may be represented by its start point $p_{s_g}^j$ and its end point $p_{e_g}^j$:

$$l_g^j = \{p_{s_g}^j, p_{e_g}^j\}$$

The geometrical description of the scaffold may allow the definition of suitable camera locations (or positions) or areas of interest in the layers of the structure. The area of interest may be the area in which connection points of the current layer with the previous layer occur. Assuming a symmetric nozzle, the center of these connecting points may be represented by the intersecting points of two consecutive layers $L^j$ and $L^{j-1}$ projected on a plane (x, y), where j>1. The intersection points may be calculated as:

$$\{p_i^j\}_{i=1,\ldots,I} = \{l_g^j\}_{g=1,\ldots,G} \cap \{l_h^{j-1}\}_{h=1,\ldots,H}$$

where g, h, i∈ℕ.

There may be different ways to calculate these points and determine the corresponding intersecting lines. If it is assumed, that the number of intersection points is significantly smaller than the square of the number of lines, applying the Bentley-Ottmann algorithm may be suitable. Before calculating the intersection points, the lines may be filtered to eliminate lines in the boundary region and to shorten calculation time. This operation may filter lines according to their length and may be adapted to the pore size of the printing part. For example, lines that are shorter than the minimal pore size of the printed structure may be eliminated. With the calculated intersection points, the camera positions may be calculated according to the field of view of the used camera. If the field of view is large enough to capture the whole layer, the center of all intersection points may be chosen as a camera spot. A camera position above smaller regions in which intersection points are located may also be calculated if the field of view is too small to monitor the entire layer. In this case, the layer may be scanned sequentially with overlapping or bordering scanning regions to evaluate the whole layer. Moreover, it may be possible to monitor the layer partially. A partial imaging of the layers based on randomly chosen intersection points may be realized. The strand sections between two intersection points may be taken as areas of interest. This technique may be suitable since deviations in strand diameters commonly occur at the bridges between intersection points. Optionally, the camera positions may be calculated to be between (e.g. to be in the center) of two consecutive intersection points. For calculating these positions, the intersection points of every line $\{l_g^j\}$ in a layer j with the lines of the previous layer $\{l_h^{j-1}\}$ may be sorted according to their position on the line $l_g^j$. The sorted points may be defined as:

$$p_{g_r}^j$$

here r is the index of the intersection points, g is the index of the line, and j is the index of the layer, with g, j, r∈ℕ. After sorting, the center of the line segment may be determined. It may also be possible to limit the range in which camera positions should be found, for example ignoring positions, which are close to the boundary. Afterwards, a number of these possible positions may be chosen randomly. The number of camera positions depends on the requirements of quality control and may be specified by the user. Alternatively, the camera positions may be calculated to be at the intersection points themselves, instead of between two intersection points. Alternatively, instead of positioning the camera based on the intersection points, it may be possible to place the camera at a position based on other factors, such as the outer coordinates of a layer, and/or based on the toolpath code.

In FIG. 2A, a layer set with two consecutive sub-layers with several intersection points and a large number of possible camera locations is shown. Of all the possible camera locations, five points (identified in FIG. 2A with an X) may be randomly chosen for example. In FIG. 2A, the result of the structure separation and position calculation is shown. Here, five monitoring positions with distances of two intersection points to the boundary may be found. In FIG. 2B a layer set with two sub-layers with fewer intersection points than in FIG. 2A is shown. Of the smaller number of possible camera locations, and one camera location (identified in FIG. 2B with an X) may be randomly chosen, for example. Alternatively, because of the set distance from the camera position to the outer boundary, only one monitoring position may be found for that layer. The x- and y-axes show the coordinates of the printer's movement. This example shows that the number of locations may be random, sequential, array-based and/or determinable by a user.

Figure 3:
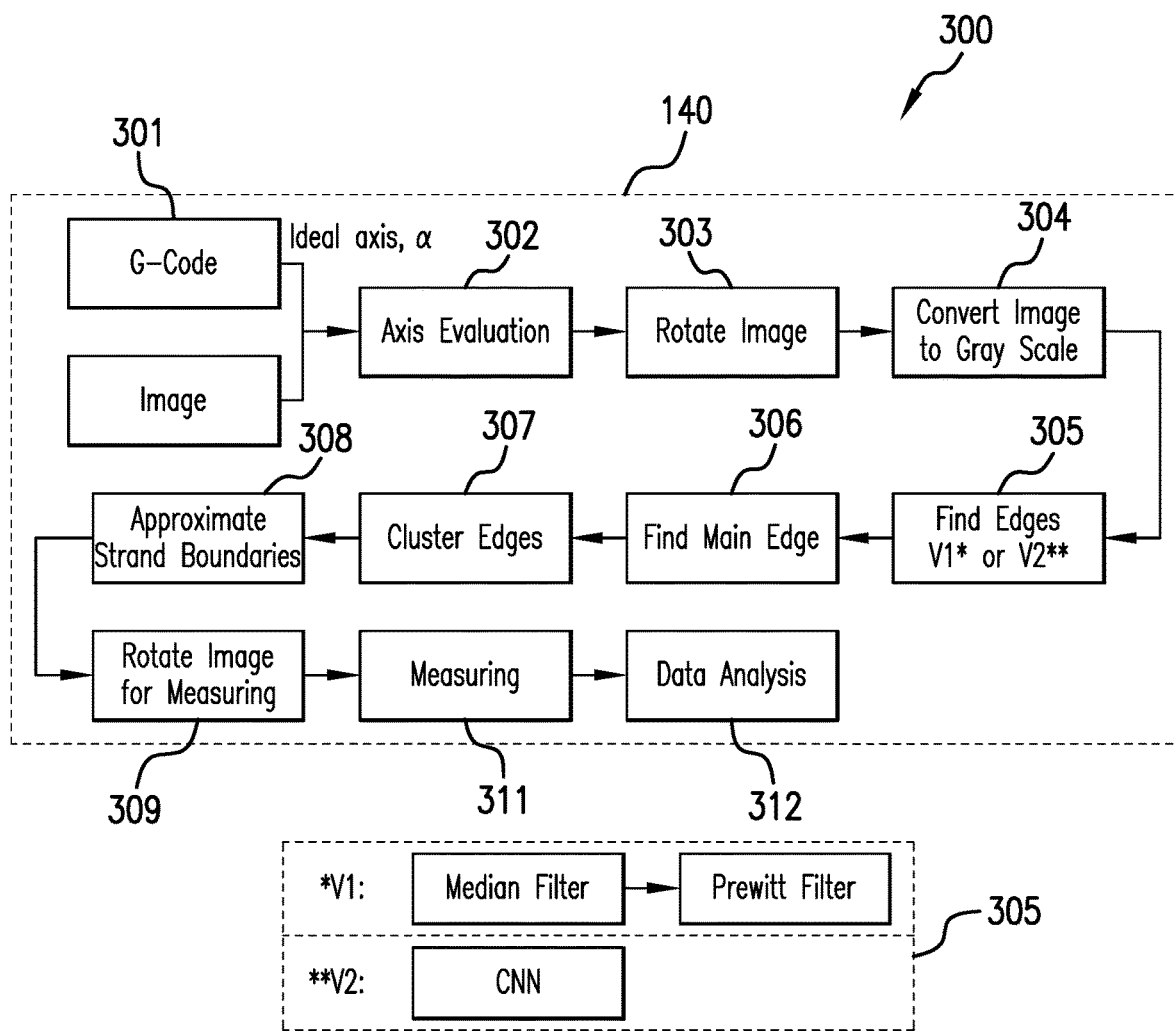
FIG. 3 shows a flow chart of at least part of a method 300 for forming a three-dimensional structure.

FIG. 3 shows a flow chart of at least part of a method 300 for forming a three-dimensional structure. FIG. 3 shows part of a process for the image processing 140 described in connection with the method of FIGS. 1A to 2B. The image processing process 140 may be further described in connection with FIGS. 4A to 15B. In addition, the method 300 may include one or more or all of the features already described in connection with FIGS. 1A to 2B.

The method 300 may include performing an image processing process 140 after forming a layer set and before forming a further layer set. The image processing process 140 (e.g. which may be carried out by a processor executing an image processing algorithm) may include or contain several processes 301 to 312 (e.g. consecutive processes) described in FIG. 3.

The image processing process 140 may include processing 301 the structural coordinate information (e.g. the G-code or numerical code) to determine an ideal axis 302 based on the structural coordinate information. For example, the image processing process 140 may include determining 302 or extracting an ideal axis of a strand. Optionally, the ideal axis may be obtained by numerical code (e.g. G-Code) structure extraction 301, wherein an extracted axis may be represented by its start point $P_s$ and its end point $P_e$.

The image processing process 140 may include fitting 303 the determined ideal axis to the acquired data after determining 302 the ideal axis. In the case of the acquired data being an image, and because the image of the strand may be taken in a specific position and in a specific scale, the extracted ideal axis may be fitted on the taken image. The fitting may be carried out by rotating 303 the image so that the extracted ideal axis may be fitted on the image, for example. This may be done because the camera position and the size of the pixels are known.

After scaling and positioning the ideal axis as in 303, the image processing process 140 may include evaluating 302 whether the axis is on a strand or not to avoid the detection of wrong edges. The ideal axis may be evaluated to be not on the strand if the printed strand is missing, printed in a wrong position, or curled significantly. Edges, not belonging to the monitored strand may be detected in this case.

Figure 4A:
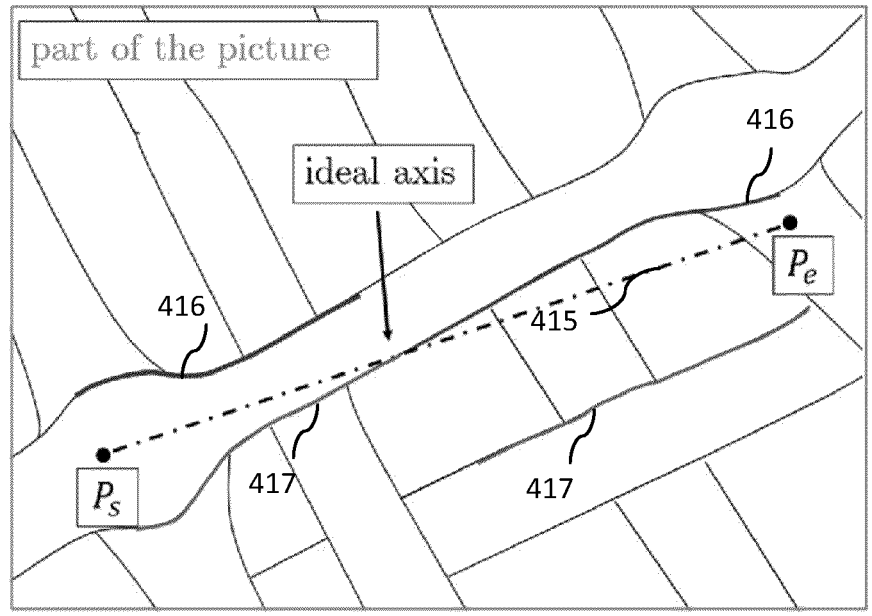
FIGS. 4A and 4B shows examples of wrongly positioned strands.
Figure 4B:
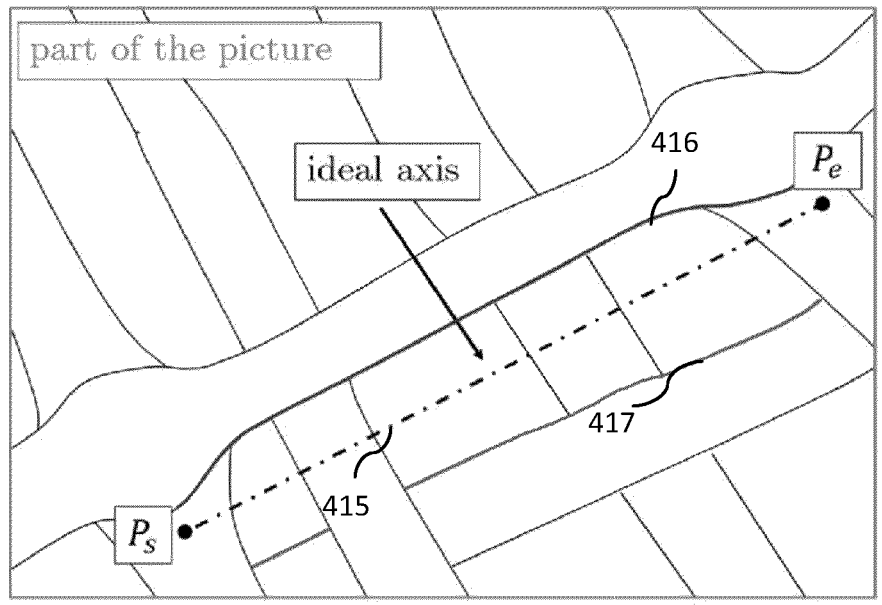

FIGS. 4A and 4B shows examples of wrongly positioned strands.

In FIG. 4A, the strand is not located on the ideal axis 415 because the strand is rotated with respect to the ideal axis.

In FIG. 4B, the strand is not located on the ideal axis because the strand is translated with respect to the ideal axis. The edges 416, 417 found next to the ideal axis are not the real edges of the strand and may not be used to measure strand dimensions, for example.

The method 300 may further include converting 304 the image to gray scale to recognize these cases. Properties of the gray values along the ideal axis may be analyzed at the beginning of the image processing. These properties may be: the difference of the average gray values of consecutive axis sections and the complexity of the function of gray values along the axis. Both represent the color homogeneity of the image along the axis. If the strand is not located on the ideal axis, it may not be possible to measure the dimension of the strand based on the ideal axis. In this application, a displaced strand may be defined as a printing defect. A displaced strand may mean that the ideal axis does not lie within any part of the strand expected at that location.

Figure 8:
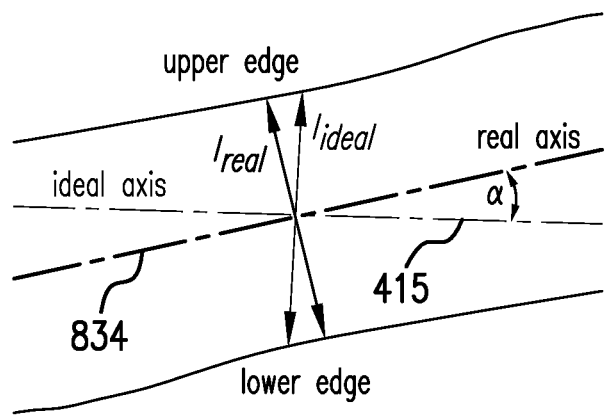
FIG. 8 shows a difference between distance measured with the real axis as reference, $I_{real}$ and the distance measured with the ideal axis as reference, $I_{ideal}$.

The method 300 may include detecting 305 the edges of the strand after converting the image to gray scale, if the ideal axis of the strand segment is positioned on the actual printed axis (for example, if the ideal axis is between the edges of the actual printed strand). For example, the edge detection 305 may include rotating and/or translating the image of the actual strand to obtain a required alignment, if the ideal axis is found to lie between the edges of the actual printed strand. For example, in the cases of FIGS. 4A and 4B, the ideal axis do not lie between the edges of the actual printed strand, and thus, edge detection is not further carried out. FIG. 8 shows a case where the ideal axis may be found to lie between the edges of the actual printed strand. However, the real axis is not yet aligned in a required direction. The required alignment may depend on the imaging sensing and image processing technique used. Since the angle of the ideal axis may be known through the G-code, the image may be rotated so that the ideal axis is aligned and/or horizontal (e.g. parallel to a direction, such as an x-direction, of the axis system). Optionally, the required alignment may be that edges of the strand are aligned (e.g. parallel and/or horizontally aligned) with the axis system). The term aligned here refers to the case of being horizontal or parallel to a required direction such as to a defined axis. It may be understood that the term aligned used in connection with the required alignment may refer to any predefined or required angle which based on a required manufacturing tolerance.

After rotating the image, the direction of the ideal axis may be defined as the x-direction, and the y-direction may be orthogonal to the ideal axis. The edge detection process 305 may be performed after rotating the image and converting the image to gray scale. The edge detection process may 305 include implementing a gradient detection process (V1*) or an artificial neural network process (V2*) such as a convolutional network (CNN) process.

Gradient based edge detectors (V1*) may be sensitive for high frequent features like edges. By taking the first derivative of the image, the features may be detected as points of high magnitude. For this reason, the image may be convolved with a filter kernel H. A simple gradient filter may be the Prewitt operator. Its kernels for filtering in x- and y-direction may be described as:

$$H_{Pr(x)} \begin{bmatrix} -1 & 0 & 1 \\ -1 & 0 & 1 \\ -1 & 0 & 1 \end{bmatrix}; H_{Pr(y)} \begin{bmatrix} -1 & -1 & -1 \\ 0 & 0 & 0 \\ 1 & 1 & 1 \end{bmatrix}$$

Noises in the image may also be high frequency features and may therefore be detected as edges. To avoid the detection of wrong edges, the image may be pre-processed before the edge detection operation. For example, the image may be blurred with a filter to attenuate noises. An example of such an operator may be a median filter, which may be an edge preserving filter, which may attenuate noises while keeping edges. A local non-linear contour preserving filter may precede the edge detection to improve the results of the gradient-based Prewitt filter operation. The preserving filter may eliminate noises which could be detected as edges. Since the orientation of the edges may be known, a filter detecting edges in only one direction may be sufficient. Compared to the size of the image, the edges to be detected may be relatively long. For this reason, the kernel of the Prewitt operator may be scaled up in horizontal direction.

$$H_{Pr(y)} = \begin{bmatrix} -1 & -1 & \ldots & -1 \\ 0 & 0 & \ldots & 0 \\ 1 & 1 & \ldots & 1 \end{bmatrix}$$

For example, the kernel may be expanded to nine elements in a row, which results in a 3×9 kernel. Dependent on the length of the edges, the size of the filter may be adapted. Subsequently, the filtered image may be scanned along the positive and the negative y-direction in a chosen range. The constant y-value of the ideal axis may be used as the starting point. If an edge with a certain thickness is found, the y-value may be noticed or detected and saved. This process may be done for every x-value of the ideal axis.

Alternatively, Convolutional Neural Networks (CNNs) (V2*) may be used to process multi array input data, and for the classification of images. In comparison to fully connected multilayer networks, the pre-processing of the input data may be integrated into the network, and feature extraction process may be done by the network itself. CNNs may be able to consider the correlation of local groups in the image. They may detect features regardless of their location, because weights may be shared by different areas of an image.

Figure 5A:
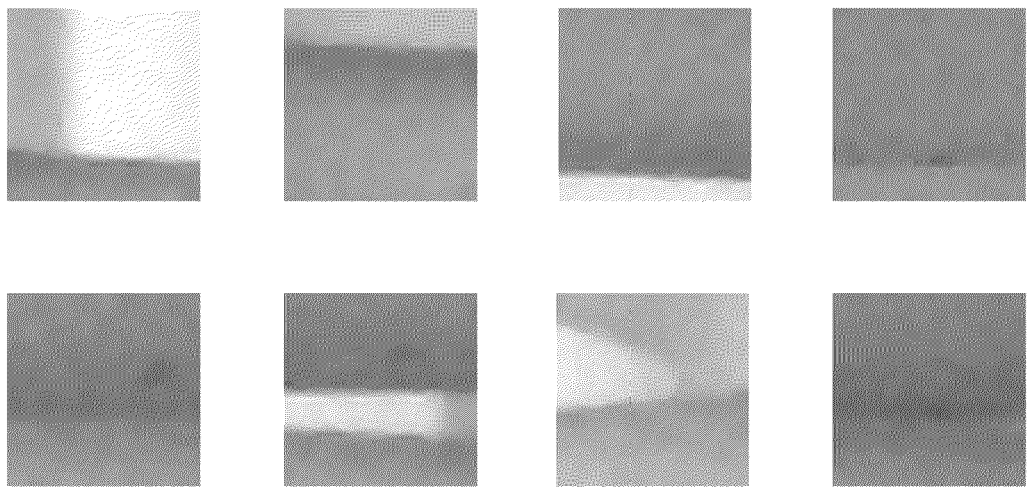
FIGS. 5A and 5B show images of Convolutional Neural Networks (CNN) training data.
Figure 5B:
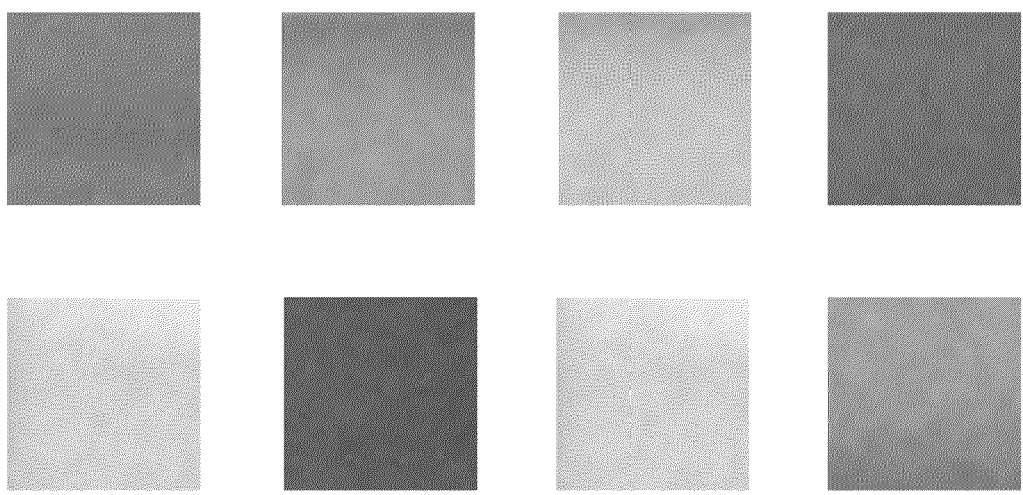

FIGS. 5A and 5B show images of CNN trainings data, wherein the CNN may be trained supervised with parts of training images acquired during previous printing process (es) of previous three-dimensional structures. The training images show parts of strands or edges. Accordingly, the training images may be labelled as "strand" or "edge". After training the network, the trained network may be used to classify edges in the unknown images acquired from the one or more locations determined for the current three-dimensional structure being monitored.

FIG. 5A shows examples of trainings data which may be labelled or identified as edges.

FIG. 5B shows examples of trainings images which may be labelled as strands.

Figure 6:
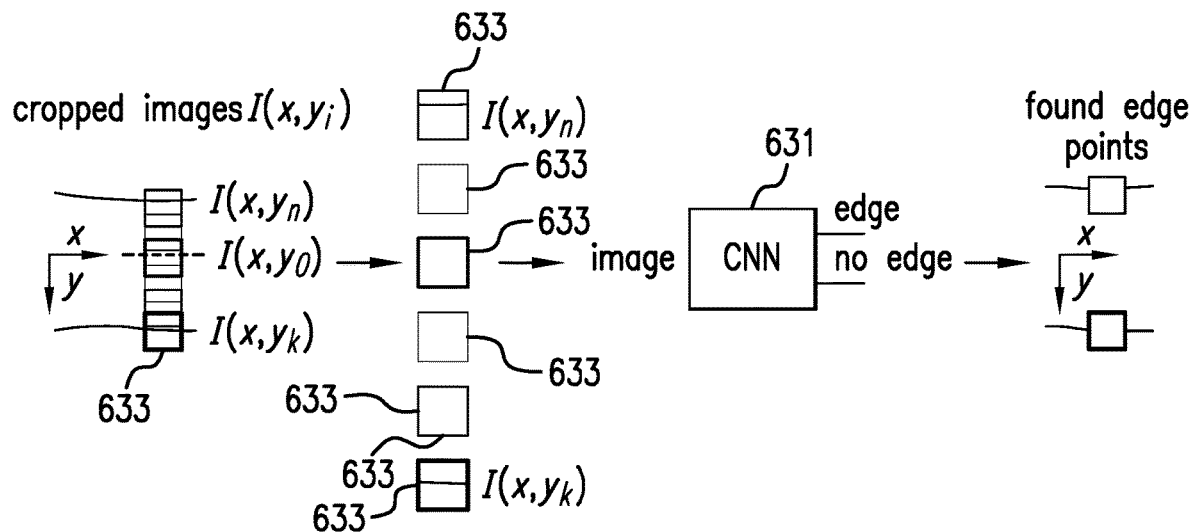
FIG. 6 shows an illustration of edge detection using Convolutional Neural Networks (CNN)

FIG. 6 shows an illustration of edge detection using the CNN 631.

Images acquired based on the formed portion may be cropped along y-direction to produce cropped images 633. For example, an entire image taken during printing at one of the determined locations may be divided (or cut) into smaller images 633. These smaller cropped images 633 may be fed into the trained CNN 631, which may classify the image according to whether the image contains an edge or not.

Similar to the gradient approach, the ideal axis may be used as a starting point for searching for edges. At a constant (same) x-coordinate, the entire image may be cropped into smaller images 633 along the positive y-direction and the negative y-direction using the y-coordinate of the ideal axis ($y_0$) as a starting point. FIG. 6 shows a plurality of cropped images 633 corresponding to the same x-coordinate, wherein each cropped images may correspond to a different y-coordinate. The regions within the cropped images may be analysed by the CNN 631. As an example, starting from a cropped image $I(x, y_0)$ at the ideal axis, the CNN may determine that the cropped image $I(x, y_0)$ may have no edge. Of the cropped images 633 in the positive y-direction, the cropped image $I(x, y_k)$ may be the first cropped image (or first region) in which an edge may be identified. Thus, the location of the centre point of the first region (or cropped image $I(x, y_k)$) containing the edge may be saved. Similarly, of the cropped images 633 in the negative y-direction, the cropped image $I(x, y_n)$ may be the first cropped image (or first region) in which an edge may be identified. Thus, the location of the centre point of the first region (or cropped image $I(x, y_n)$) containing the edge may be saved. The process may be repeated for each x-coordinate of the ideal axis. In both cases, gradient-based and CNN-based edge detection, the results of the edge detection may be all the edge points that were found above and below the ideal axis.

Figure 7A:
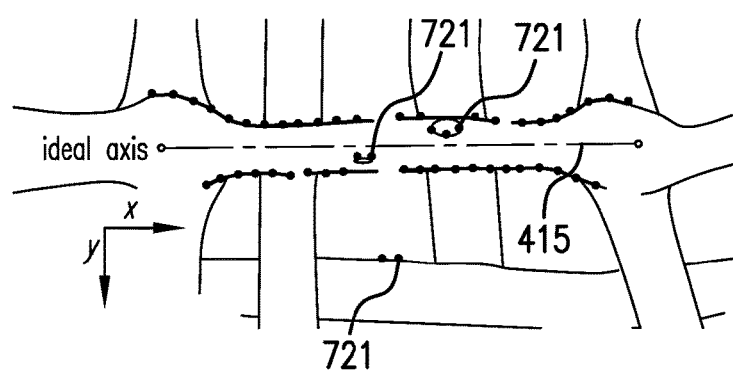
FIG. 7A shows edge points found from an edge clustering process including correct and incorrect edges 721.
Figure 7B:
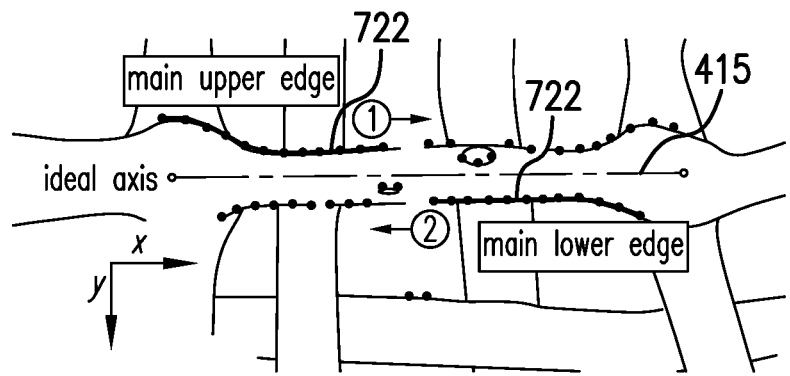
FIG. 7B shows an outcome of using edge clustering to determine main edges.
Figure 7C:
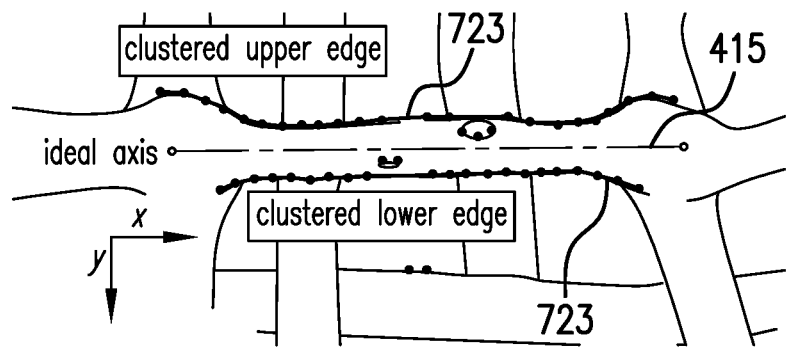
FIG. 7C shows a further clustering process for identifying a clustered upper edge and a clustered lower edge.

The method 300 (as shown in FIGS. 7A to 7C) may further include identifying 306 (or finding) one or more main edges and performing an edge clustering process 307 after identifying (or finding) 305 the edges, since the found edges or edge points in 305 may contain correct and/or incorrect edges.

FIG. 7A shows the found edge points from an edge clustering process including correct and incorrect edges 721. Wrong edges 721 may be found because of reflections, noises and neighbouring strands. For this reason, the found edges may need to be analysed further.

FIG. 7B shows an outcome of using edge clustering to determine 306 the main edges. In order to determine the main edges of the upper and the lower boundaries, the angles between neighbouring edge points may be calculated. Points may be clustered in order of their x-value as long as the angle between two neighbouring points is below a threshold. If the threshold is exceeded, a new cluster may be created. The main edge may be defined as the largest cluster, assuming that the longest continuous edge belongs to the real boundary of the strand. The main edge may be the whole boundary of the strand or a segment of the boundary. The outcome of this clustering is illustrated in FIG. 7B. The longest cluster of consecutive edge points may form the main edges 722, e.g. a main upper edge and a main lower edge. Point 1 and 2 may be starting points of a further (or following) cluster process.

FIG. 7C shows a further (or final) clustering process 307 which identifies a clustered upper edge 723 and a clustered lower edge 723. In the further clustering 307 process, the remaining edge points may be collected using the outer points of the main edges as starting points. This clustering is based on the nearest neighbor method. The nearest neighbor may be added into the cluster if the x- and y-difference between the neighbors is below a set threshold. By this method, outliers may be removed during the clustering process by using the main edge as references. In this way, the actual edges 723 (e.g. the actual upper edge and the actual lower edge) of the targeted strand may be identified.

The method 300 may further include approximating 308 strand boundaries after performing the edge clustering process 306, 307. An edge function may be approximated 308 using the clustered edge points by minimizing the squared error. To detect wrong approximations, the characterizations of the edge functions may be analyzed.

If both boundaries of the strand are found, the diameter of the strand may be measured. In order to achieve a proper measuring process, the measuring axis (e.g. the real axis) of the strand may be determined. The real axis of the strand may be calculated by means of an approximated edges function. The ideal axis of the strand may lead to wrong measurements because the strand may be displaced by translation and rotation during the manufacturing process.

FIG. 8 shows how measuring with the ideal axis 415 as the reference may result in wrong measurements due to the printed strand being rotated by the angle $\alpha$ in respect to the ideal axis (e.g. an angle between the ideal axis 415 and the real axis 834 may be $\alpha$, optionally where $0°<\alpha<180°$). The distance between the upper edge and the lower edge may be measured orthogonal to the reference axis, and FIG. 8 shows that errors may occur due to the difference between the distance measured with the real axis as reference, $I_{real}$ and the distance measured with the ideal axis as reference, $I_{ideal}$.

The method 300 may further include rotating 309 the image for measuring after approximating 308 the strand boundaries. For example, the method 300 may be rotated so that the real axis is matched to a required direction.

The method 300 may further include measuring 311 a dimension of the strand. For example, the diameter of the strand may be measured 311 by calculating the distance between the upper 723 and the lower edge 723 in a direction orthogonal to the real axis.

FIG. 9A to 9D show different three-dimensional structures which may be printed. The different structures including breast implants and cell culture meshes may be printed and monitored during the manufacturing process. The structures may be manufactured with various parameters. For example, they may be printed with different nozzle diameters and pore sizes as well as a varying number of layers.

Figure 9A:
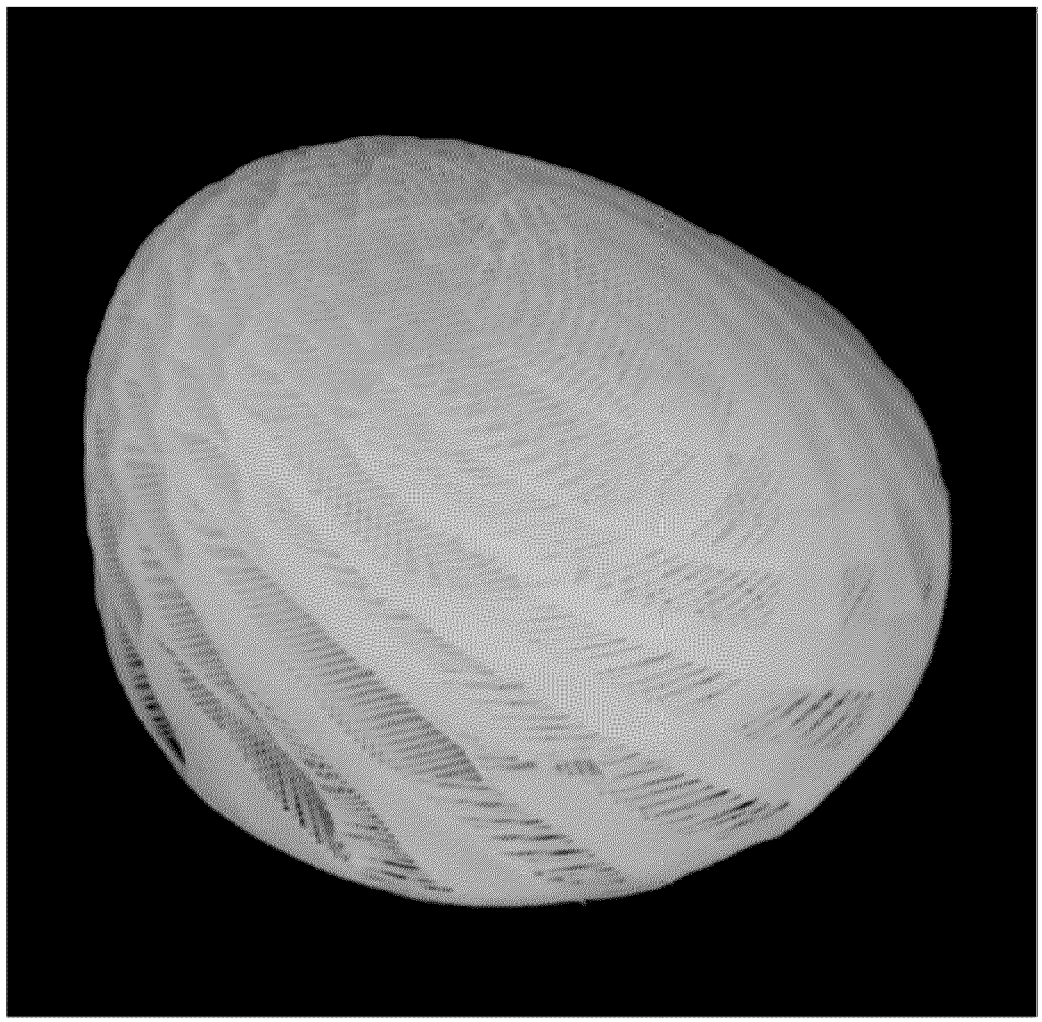
FIG. 9A to 9D show different three-dimensional structures which may be printed.

FIG. 9A shows a breast implant scaffold (volume of 50 ml). At the bottom, the average pore size may be 6 mm. The pore size may decrease with increasing height, so that the average pore size reaches 3 mm at the top. To avoid forming barriers, which impede tissue growth, the layers may be printed with an offset to the previous layer. By this technique, sloped channels and the characteristic overall shape may be formed. The outer boundary develops from circular structures, while the inner structure only contains orthogonal crossing straight strands. The structure may be printed with a nozzle diameter of 350 μm.

Figure 9B:
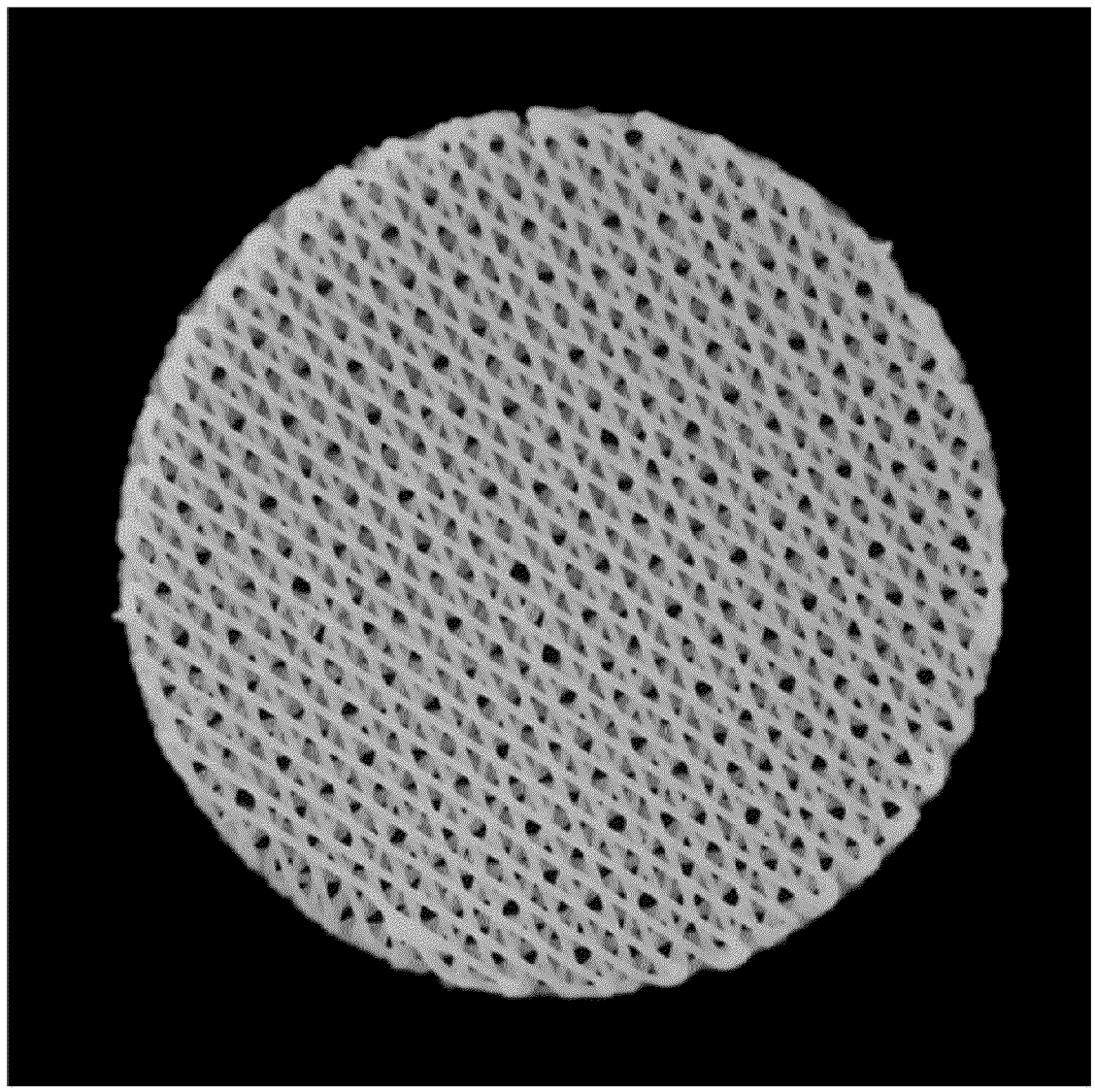

FIG. 9B shows a cell culture mesh with 350 μm strand width, 700 μm pore size and a strand orientation offset of 36° per layer. The structure may be printed with a nozzle diameter of 350 μm.

Figure 9C:
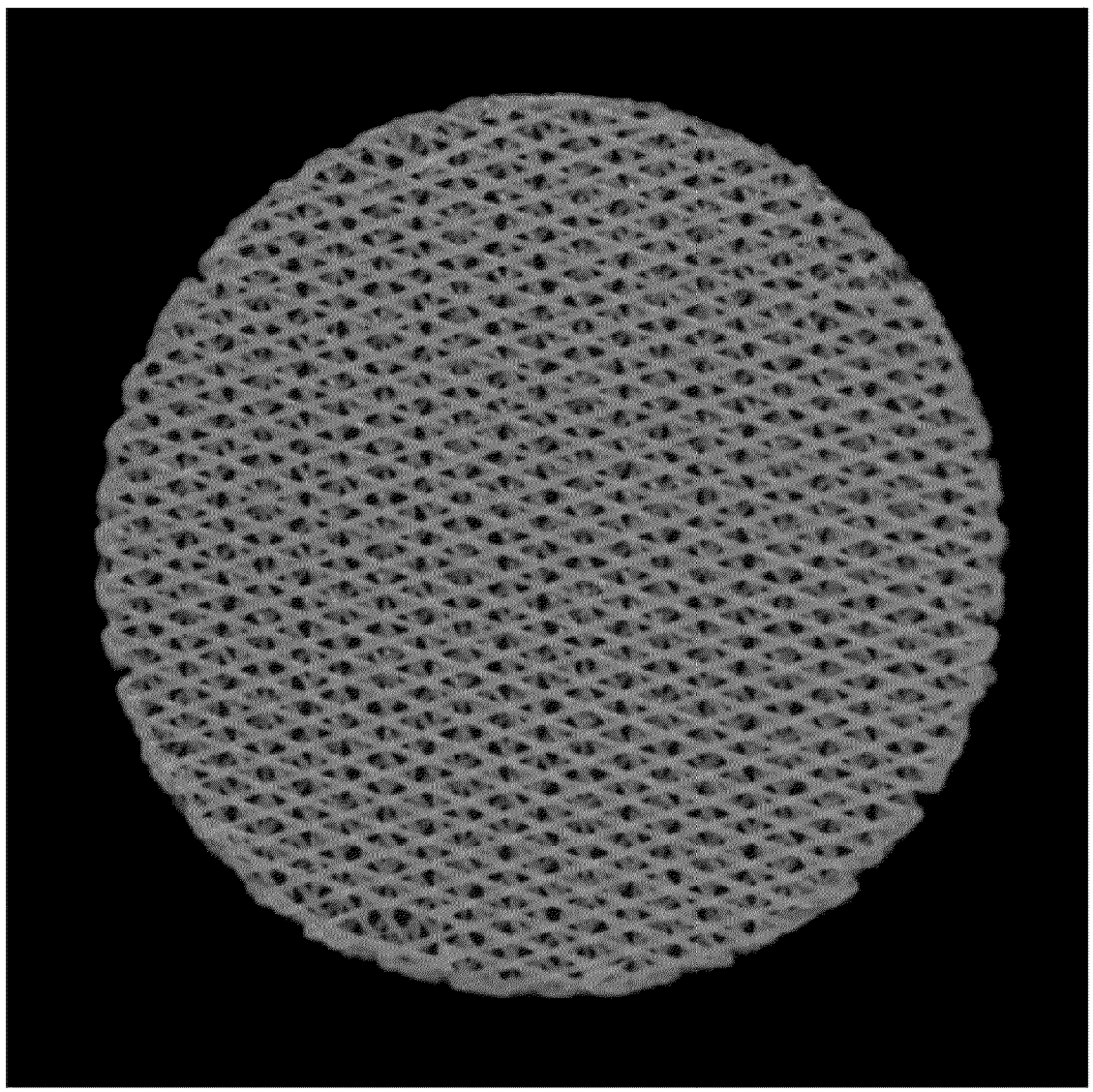

FIG. 9C shows a cell culture mesh with 150 μm strand width, 400 μm pore size and strand orientation offset of 36°. The structure may be printed with a nozzle diameter of 150 μm.

Figure 9D:
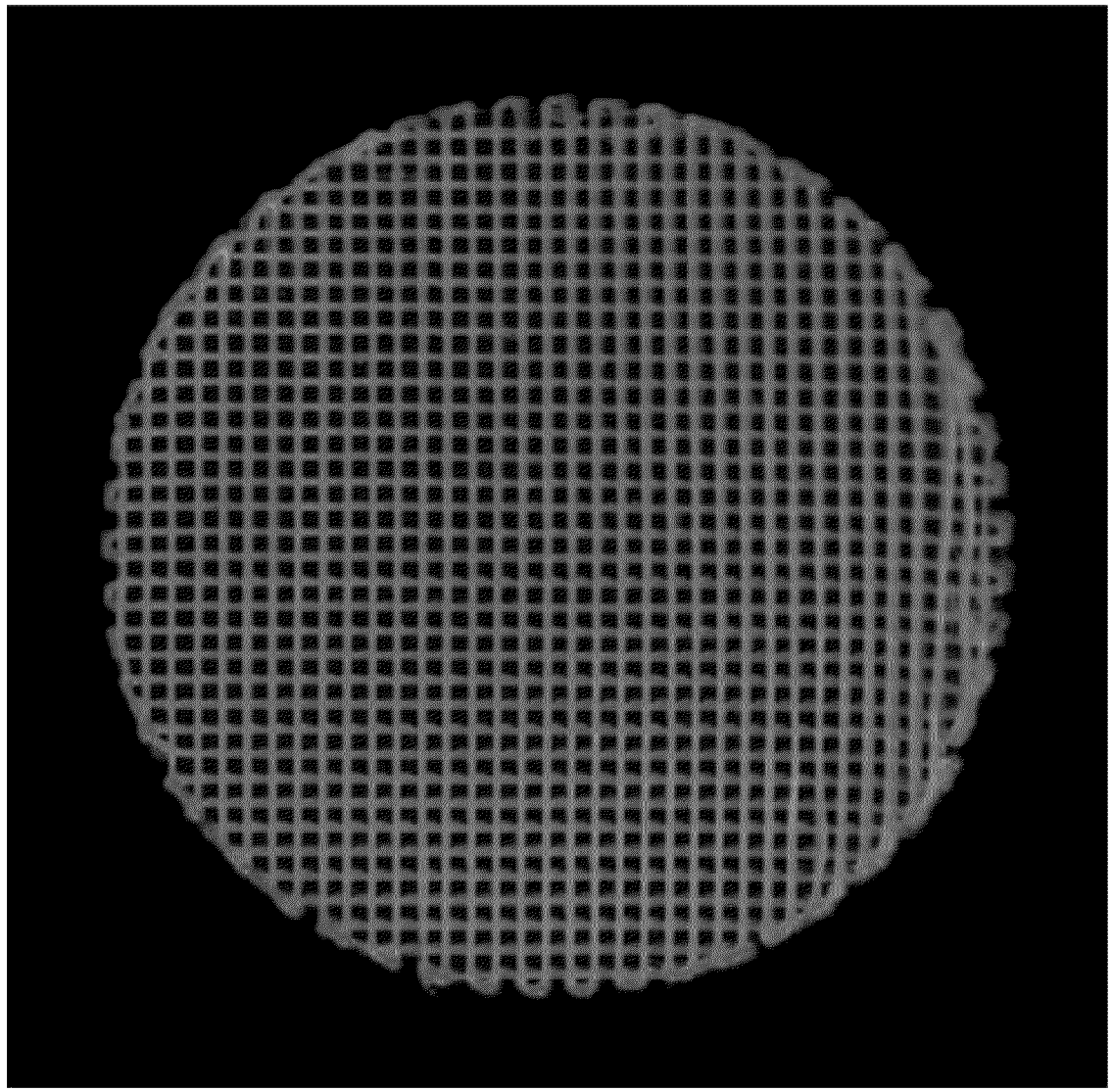

FIG. 9D shows a cell culture mesh with 150 μm strand width, 400 μm pore size and a strand orientation offset of 90°. The structure may be printed with a nozzle diameter of 150 μm.

To obtain processable images, the structures (of FIGS. 9A to 9D) may be lit from below using LED lights, which may be placed underneath the substrate on which the structures were printed. To automate the camera positioning, the numerical code of each structure may be modified as explained above to include information related to the one or more locations. The camera may be moved to the calculated positions and paused there until the image is taken and saved with an image capturing software. As an example, a magnification of 40 may be used to measure the strand diameters of the 50 ml breast implant. As an example, four strands per layer may be monitored during the printing process. While printing the meshes, 10 strands per layer may be monitored using magnifications of 140 and 200 depending on the pore size of the meshes. In other words, the number of locations may be determined by a user and may be varied according to the stringency of the manufacturing requirements FIGS. 10A to 10F show images from visually monitoring a 50 ml breast scaffold (described in FIG. 9A) using gradient-based edge detection.

Figure 10A:
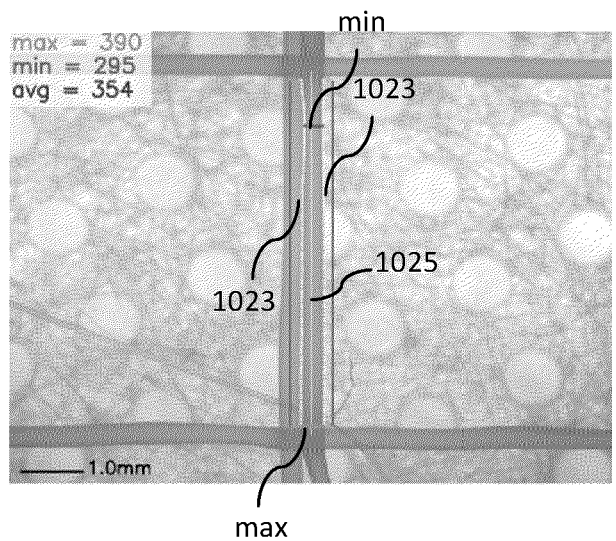
FIGS. 10A to 10F show images from visually monitoring a 50 ml breast scaffold using gradient-based edge detection.

FIG. 10A shows an overlapping vertical strand in the third layer of the three-dimensional structure.

Figure 10B:
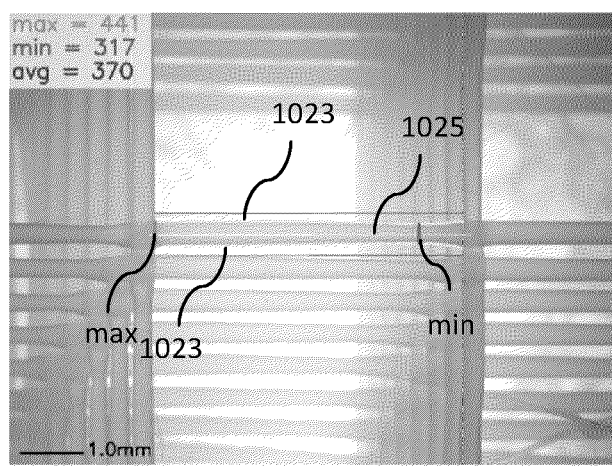

FIG. 10B shows a horizontal strand in the fifteenth layer of the three-dimensional structure.

Figure 10C:
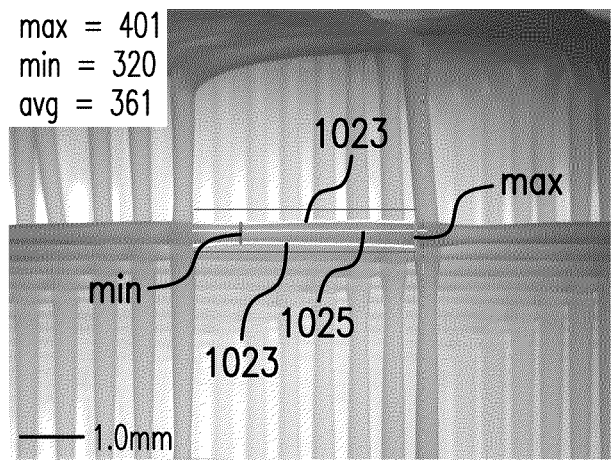

FIG. 10C shows an overlapping horizontal strand in the forty-third layer of the three-dimensional structure.

Figure 10D:
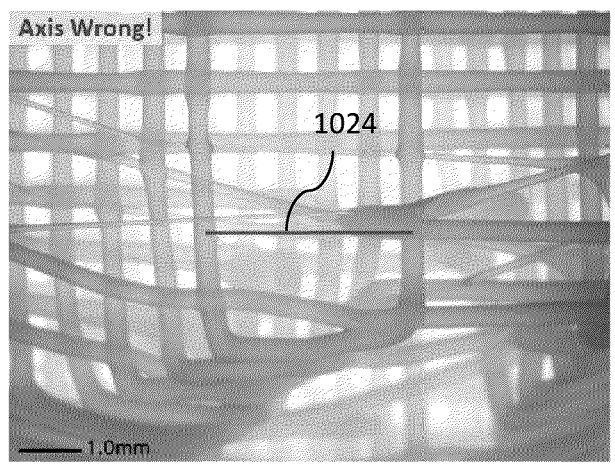

FIG. 10D shows a missing horizontal strand next to the boundary in the fifty-third layer of the three-dimensional structure.

Figure 10E:
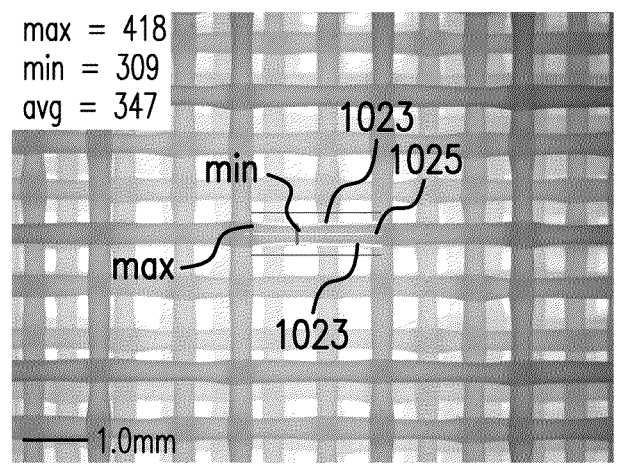

FIG. 10E shows a horizontal strand in the seventy-fifth layer of the three-dimensional structure.

Figure 10F:
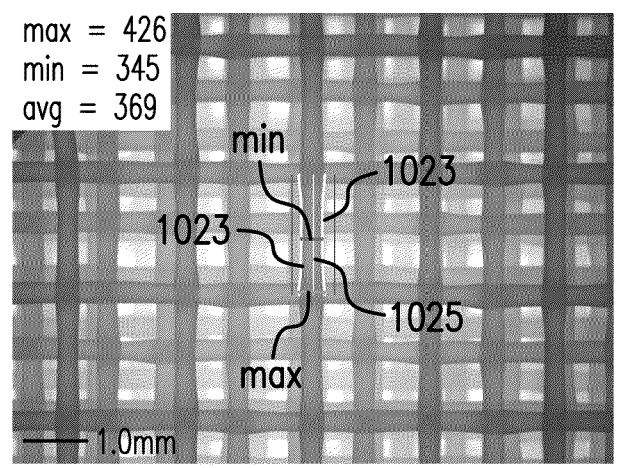

FIG. 10F shows a vertical strand in the eightieth layer of the three-dimensional structure.

A gradient-based approach may be used to detect the boundaries of the strands. Layers in different heights are shown, starting from the third layer in FIG. 10A. In the image of the third layer (FIG. 10A), the structure of a piece of paper that was positioned underneath the substrate may be seen, which becomes out of focus with the growth of the scaffold. Also, the lighting may change with the growing structure. This is due to the fact, that the scaffold may scatter the light by its structure. Due to the architecture of the implant, overlapping strands may occur in the print, which means that parts of a strand of the current layer are on top of strands of the second last layer. These layers are not connected in a physical way, but are separated by a gap between them, although they may look as if they are on top of each other because of the two-dimensional view. This effect occurs in FIGS. 10A and 10C. Nevertheless, the boundaries of the strands (lines 1023) may be detected correctly. In FIG. 10D, the strand that should be observed (e.g. expected to be observed based on the structural coordinate information) is missing. In the background of this image some dragged strands may be seen. The process of axis evaluation correctly stated a wrong location of the axis which means that the strand was not printed on its ideal axis. This displacement may be recorded as a defect. In this image, the ideal axis is represented by the line 1024. FIGS. 10E and 10F images were taken in the higher layers of the scaffold. In these layers, the pore size may be significantly smaller than in the lower layers.

In the processed images, the value of the minimal (min) or smallest diameter or width and maximal (max) or largest diameter or width of the strands and their locations may be visualized and measured, for example. Optionally, an average diameter or width (avg) in µm, may be determined by measuring a plurality of diameters along the monitored strand segment.

FIGS. 11A to 11F show images from visually monitoring the strands in the cell culture meshes described in FIGS. 9B to 9D. For detecting the boundaries, the gradient-based approach may be used. In comparison to the observation of the scaffolds (in FIGS. 10A to 10F), a higher magnification may be set, since the structures to be measured are smaller.

Figure 11A:
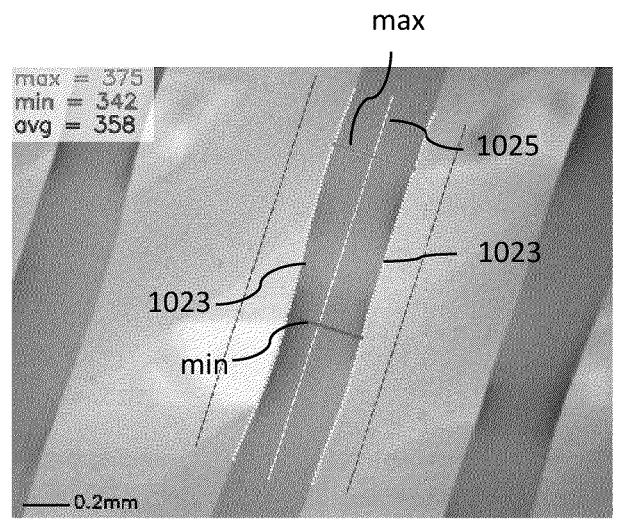
FIGS. 11A to 11F show images from visually monitoring strands in the cell culture meshes.
Figure 11B:
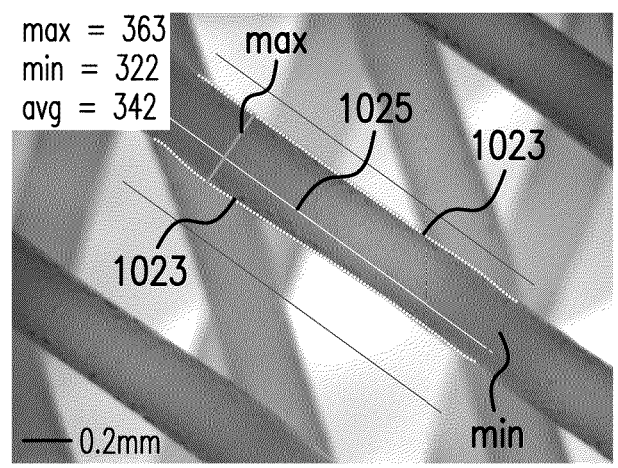

FIGS. 11A and 11B shows strands with 350 µm diameter in a mesh with a pore size of 700 µm and a change in strand direction of 36° per layer. The strands of consecutive layers may cross each other at an angle of 36°. The images were taken with a magnification of 140.

The following four images visualize the measurement of strands in meshes with even smaller structures. The requested pore size of the meshes was 400 µm, the demanded strand diameter was 150 µm. These images were taken with a magnification of 200.

Figure 11C:
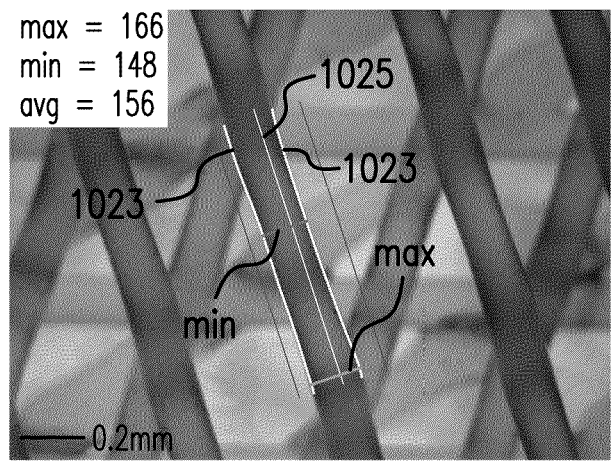
Figure 11D:
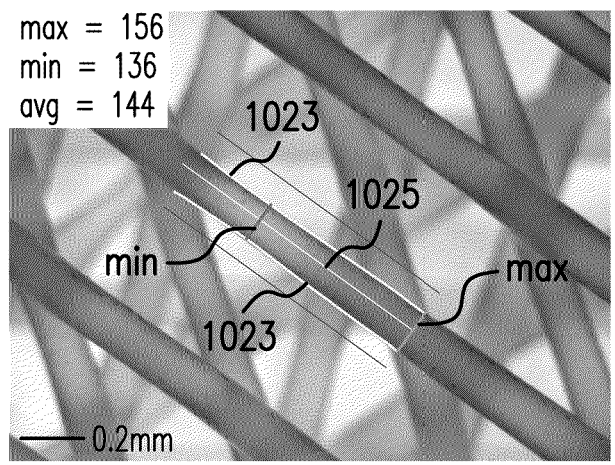

FIGS. 11C and 11D show strands with 150 µm diameter in a mesh with a pore size of 400 µm and a change in strand direction of 36° per layer.

Figure 11E:
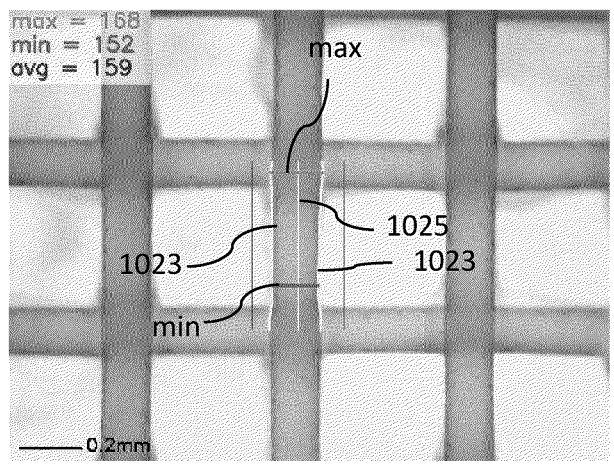
Figure 11F:
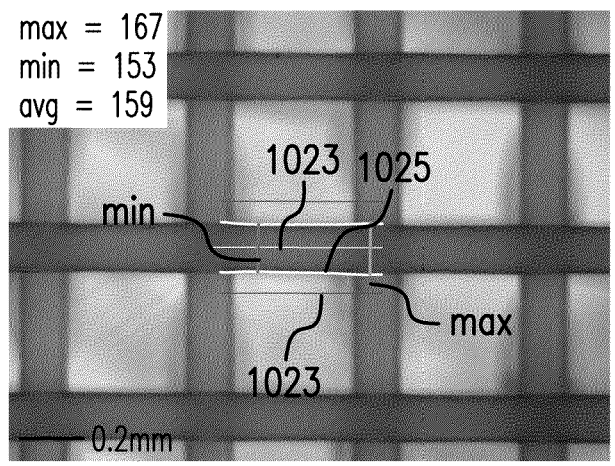
Figure 12A:
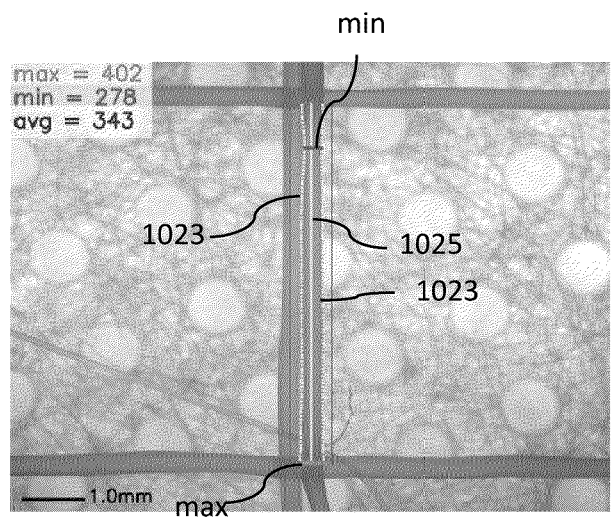
FIGS. 12A to 12F show images from visually monitoring a 50 ml breast scaffold using a Convolutional Neural Network (CNN)
Figure 12B:
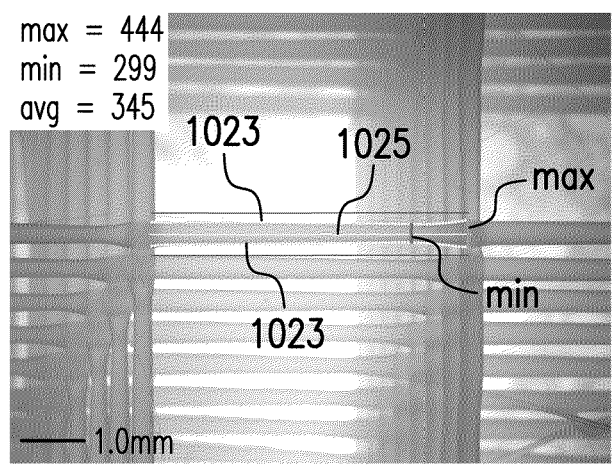
Figure 12C:
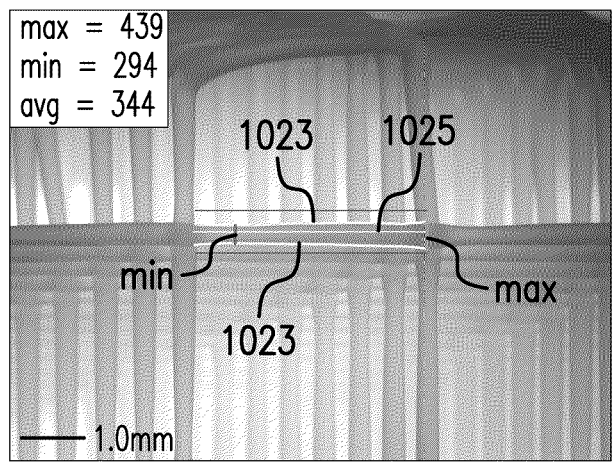
Figure 12D:
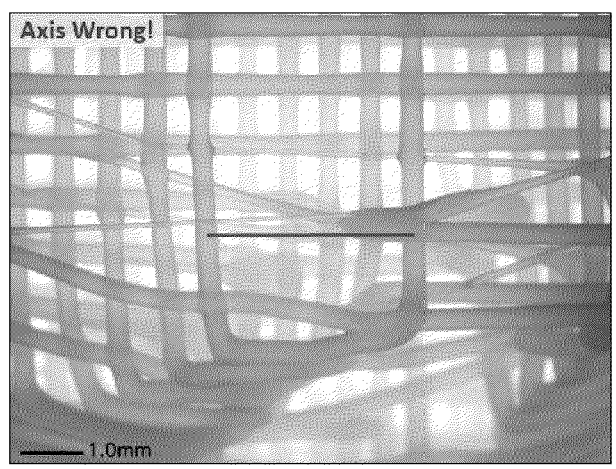
Figure 12E:
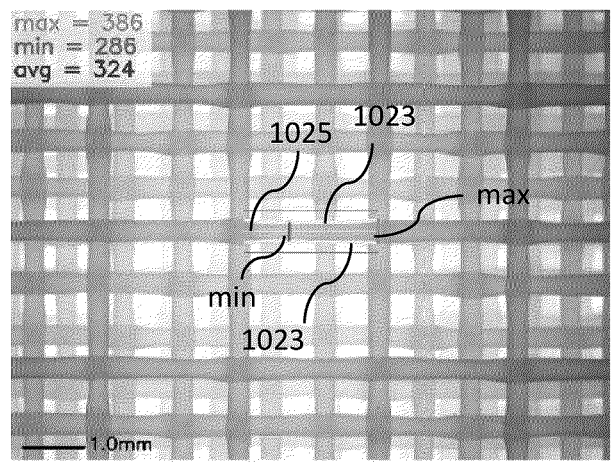
Figure 12F:
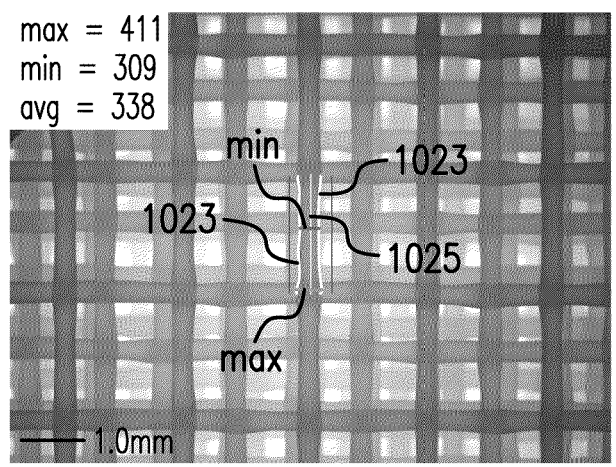

FIGS. 11E and 11F show strands with 150 µm diameter in a mesh with a pore size of 400 µm and a change in strand direction of 90° per layer.

FIGS. 12A to 12F show the outcomes of image processing, where a CNN was used to detect edges or boundaries. FIGS. 12A to 12F show raw images taken during the manufacturing process of the 50 ml scaffold, the same respective strands as in the gradient-based approach described in connection with FIGS. 10A to 10F. Similar results were obtained, although some deviations between the measurements using the gradient-based and the CNN-based edge detection may be observed. These deviations may be in a scale of up to 30 µm. Due to these deviations, the measured minimum, maximum and average diameters of the CNN-based edge detection approach and the gradient-based approach may be different. These differences may be due to the size of the cropped images, which may be fed into the CNN network. Because the locations of the edges on the classified images are not exactly known, there may be a possible deviation that may be as large as the size of the cropped images. The effect becomes particularly apparent in FIG. 12F by observing the ripped approximated edge functions. Because in most of the cases edges were detected earlier (as soon as they appear at the boundary of the image), the occurred deviations were smaller than the size of the cropped images. Due to the size of the images that were fed into the network, the CNN-based technique shown here may appear to be less precise than the gradient based approach, which reached a resolution of 5 µm at a magnification of 40. However, if needed to improve the resolution, smaller parts of the image may be fed into the CNN if required. To accomplish this, the CNN network may be trained with smaller images as well. Moreover, a better resolution may be reached by increasing the training data, and/or by training the network with specific images which may include or contain edges that could not be identified by the network before if required.

In CNN-based edge detection edges may be found or observed along the whole ideal axis. This may be observed when comparing the respective images of FIGS. 10A to 10F and FIGS. 12A to 12F. In comparison, with the gradient-based edge detection, no edges may be found or observed in the very first and last section of the ideal axis. However, these edges may be detected by the CNN. For example, in FIG. 10C no edges may be found at the very last section of the ideal axis by the gradient-based approach, whereas these edges may be detected using the CNN (see FIG. 12C). When considering processing time, the gradient-based technique may be faster than the CNN-based approach. However, whether or not the larger time consumption of the CNN-based approach is critical depends on the application. On the other hand, the trained CNN may be capable of classifying edges in low contrast areas better than the gradient-based method. Depending on the size of the imaged used in the CNN-based approach, the gradient-based approach may be more precise. It may be possible to monitor scaffolds with large pore sizes of 6 mm as well as small pore sizes of 400 µm. However, different magnifications of the digital microscope may be used to compensate the difference of the feature sizes.

In analyzing data, the average diameter of a strand and the average value of all average diameters of one layer may be meaningful variables to measure. Insufficient strand diameter may limit the mechanical properties of the scaffolds. On the other hand, strands which are too thick make the print stiff and decrease the pore size, which may limit the process of tissue growth in medical applications. If the average diameter is not within a given tolerance, printing parameters may have to be adjusted. An insufficient average diameter may be compensated by increasing the flow rate of material or decreasing the printing speed. Conversely, diameters may be decreased by decreasing flow rate or increasing speed. A clogged nozzle in need of cleaning may also cause insufficient diameters. Further important measurable variables may be the maximal (largest) and minimal (smallest) diameters or widths of strands and their locations as well as the progress of the diameter along the strand. With this information it may be possible to classify defects. Having an average diameter within the tolerance but varying diameters along the strand, may be concluded to be due to narrowing effects due to an insufficient layer clearance or unfavorable temperature conditions. In this case, printing conditions may be improved by increasing the layer clearance, extending the cooling process, and/or adjusting the ambient temperature. Moreover, the steadiness of the printing process may be evaluated. To examine the steadiness, it may be possible to determine the standard deviation of one or more or all average diameters, minimum diameters or maximum diameters of one layer, or of the entire printing part. If the standard deviation is low, the printing process may be consistent and stable, which may be a good starting point for the optimization of the printing parameters. On the other hand, a high standard deviation may indicate an inconstant process. In such cases, it may be useful to make the process reliable and consistent before optimizing the size accuracy of the strand diameters. Furthermore, non-measurable diameters may indicate geometrical problems, such as displaced strands. The reasons for these errors may include warping, a clogged nozzle, dragged off strands or an imprecise movement of the printer's axes.

Some of these evaluation methods may be explained with respect to results extracted from the monitoring process of the breast implant scaffold described in connection with FIG. 9A. Three different analyzing levels are illustrated. The first level may verify the whole printing part in general, and all measured diameters may be considered. By this, the overall quality of the printing object may be assessed. The second level may be a layer-wise evaluation which may be used for the decision whether a single layer meets the quality requirements. In the third level, the dimensions of single strands may be analyzed. This level of evaluation may be used to classify defects and to optimize printing parameters systematically.

Figure 13A:
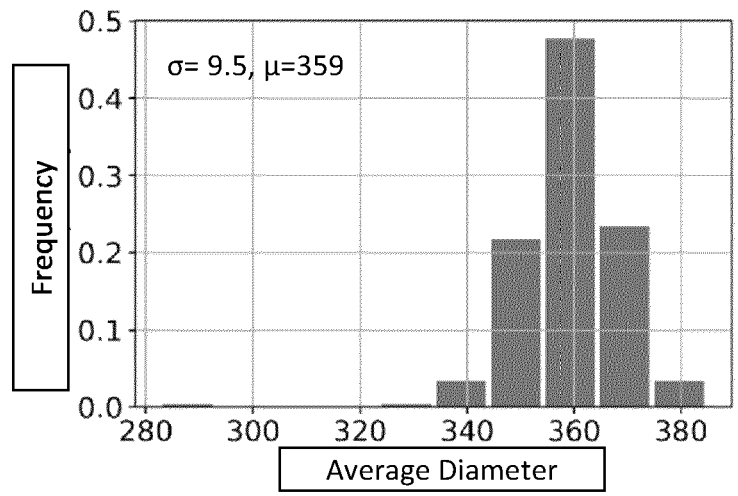
FIGS. 13A to 13C show first level evaluations using histograms of measured strand diameters (minimal, maximal and average diameters) of a 50 ml breast implant scaffold.
Figure 13B:
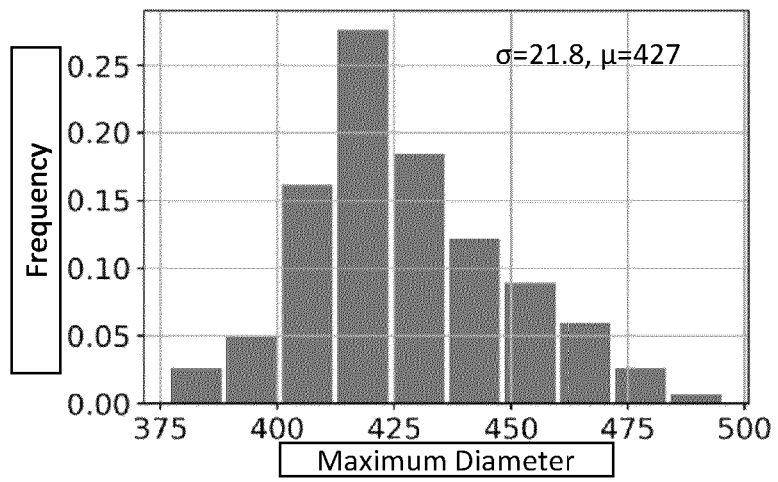
Figure 13C:
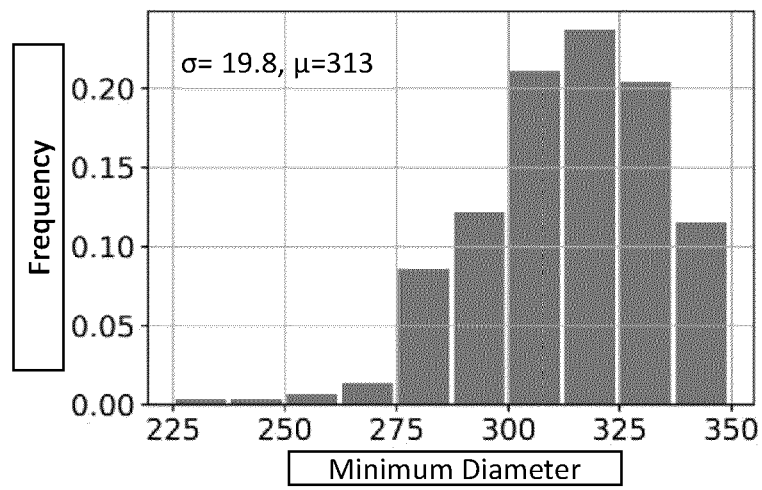

FIGS. 13A to 13C show first level evaluations using histograms of all measured strand diameters (minimal, maximal and average diameters) of the breast scaffold. To evaluate the quality of the entire printing part or of all printed strands at a certain time, the frequency of measured diameters may be displayed by histograms. This is a suitable technique since histograms may show all ranges of measured diameters. In addition, the dispersion of measured diameters may be visualized. This kind of evaluation does not only have to take place after finishing the print but may also happen during the printing process.

FIG. 13A shows a histogram showing a dispersion of average diameters of the strands vs frequency for the example of the breast scaffold. As shown in FIG. 13A, the difference between the ideal diameter of 350 µm and the mean (µ in µm) of all measured average diameters does not exceed a difference of 10 µm. The standard deviation ($\sigma=9.5$) is low.

FIG. 13B shows a histogram showing a dispersion of maximum (maximal or largest) diameters of the strands vs frequency for the example of the breast scaffold.

FIG. 13C shows a histogram showing a dispersion of minimum (minimal or smallest) diameters of the strands vs frequency for the example of the breast scaffold.

When it comes to the measured maximum and minimum diameters, the standard deviation may be higher ($\sigma=21.8$, and $\sigma=19.8$) respectively. Depending on the permitted tolerance, the frequencies of strand diameters falling below the lowest permitted diameter or exceeding the highest permitted diameter may be determined.

Figure 14A:
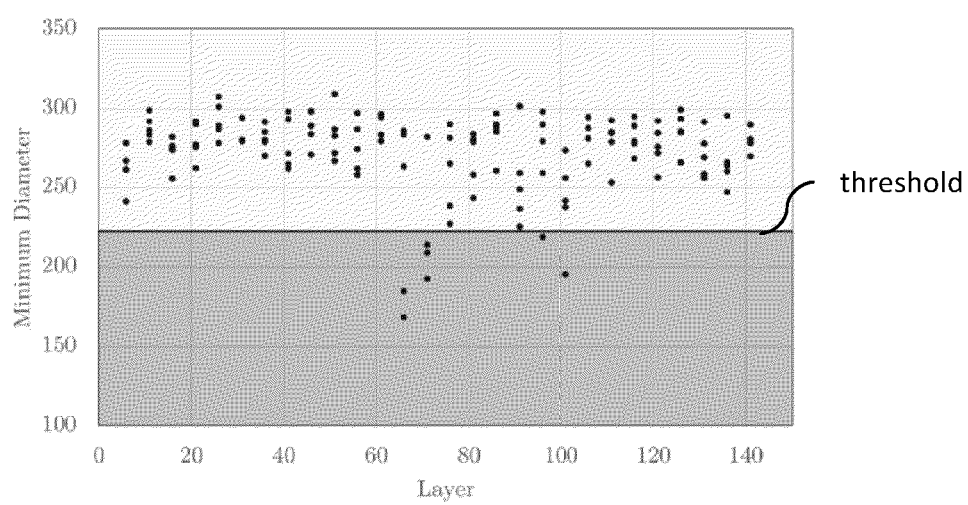
FIGS. 14A to 14C show second level evaluations such as a layer-wise evaluation of the 50 ml breast implant scaffold.
Figure 14B:
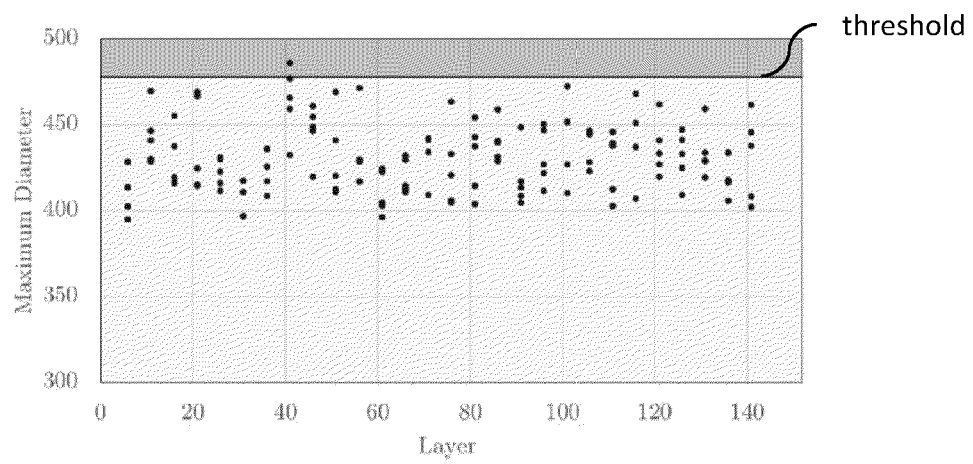
Figure 14C:
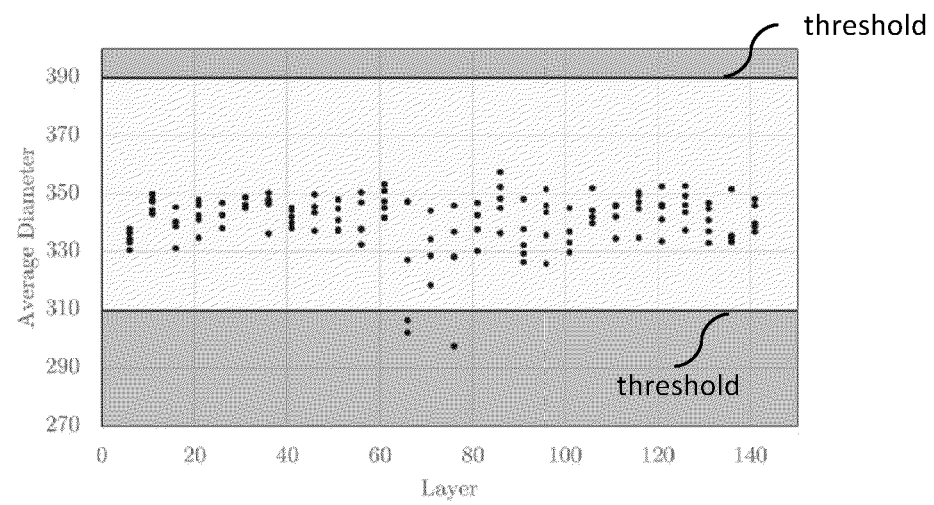

FIGS. 14A to 14C show second level evaluations such as a layer-wise evaluation of the 50 ml scaffold. FIGS. 14A to 14C show the measured diameters being displayed layer-wise, with FIG. 14A showing the minimum diameters, FIG. 14B showing the maximum diameters and FIG. 14C showing the average diameters. Having these graphs, it may be easily determined in which layers diameters are out of the specified range of tolerance. Depending on the quality requirements, layers may be labelled as failed layers if a certain number of diameters within this layer are out of the required tolerance. In the shown examples in FIGS. 14A to 14C, different threshold values may be determined by a user. For example, the minimum diameter of the strands should not fall below 225 µm. The maximum diameter should not exceed 475 µm. The average diameter should be in the range of 310 µm to 390 µm. Strands with diameters which are out of tolerance may be regarded as defects and a defective process status may be determined. The decision whether single layers or the entire structure meet the required quality depends on the quality desired. Strand diameters lying outside the permissible range of diameters are determined as failing the specified quality requirements.

For the classification of the defect and for optimization purposes, it may be useful to evaluate the course of diameters along single strands.

Figure 15A:
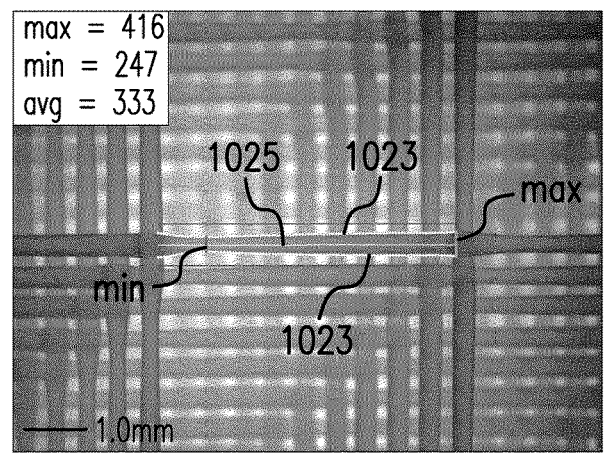
FIGS. 15A to 15B show third level evaluations, wherein strand-wise evaluations of a strand of the 50 ml scaffold may be carried out.
Figure 15B:
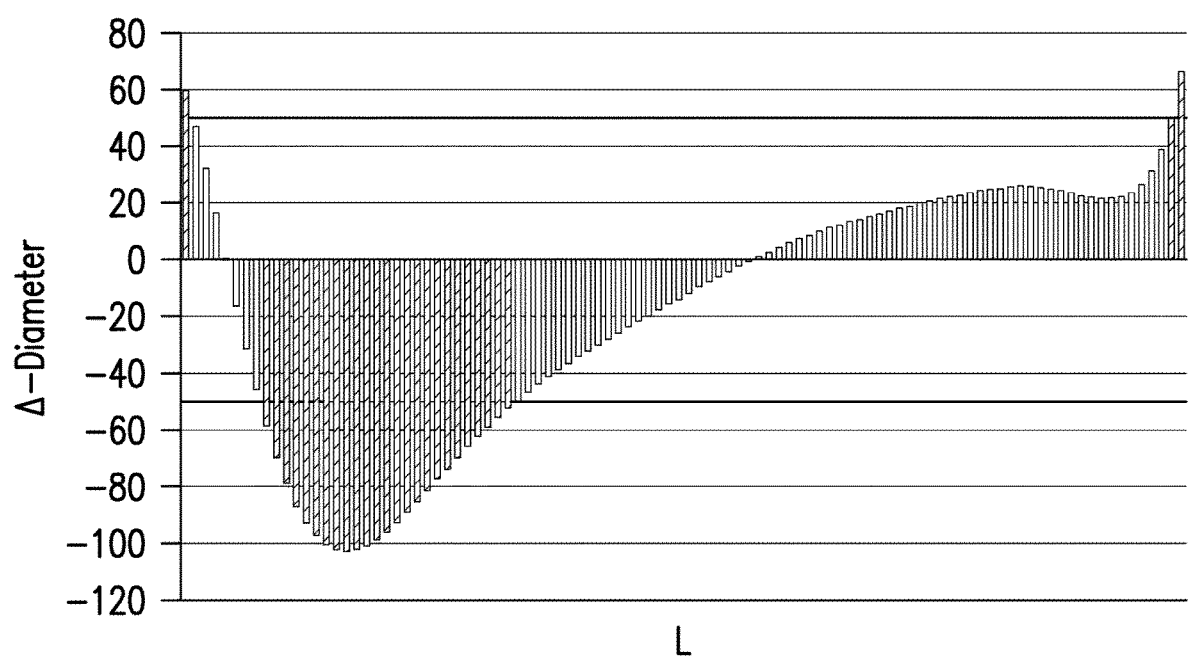

FIGS. 15A to 15B show third level evaluations, wherein strand-wise evaluations of a strand of the 50 ml scaffold may be carried out.

FIG. 15A shows a visual result of the measuring process.

FIG. 15B shows a graph of all deviations from the ideal strand diameter (350 µm) along the length of the strand L. The range of tolerance may be set to ±50 µm, for example Measurements less than or equal to ±50 µm from the ideal diameter may be determined to pass the specified quality requirements, whereas deviations greater than ±50 µm may be determined as not passing. The characteristics of the displayed graph may vary depending on the type of defect, which may enable the classification of defects. This classification may be used to adjust printing parameters systematically if the causes of the classified defect are known. In FIG. 15B, critical portions of the examined strand may be localized. The most critical part of the strand may be the minimum diameter, which deviates more than 50 µm from the ideal diameter. Because the minimum width of the strand is located outside its centre, this defect may be classified as the narrowing effect, which may occur due to an unsuitable cooling process or insufficient layer clearance.

It may thus be understood that whether or not a printing process is stopped (e.g. stop print 180) or not stopped (e.g. and instead adapting printing parameters 170) may be based on the required stringency of the evaluation process. For example, the decision to stop print 180 may depend on a frequency of deviations of the determined parameter value from an ideal parameter value and/or magnitude of the deviations of the determined parameter value from an ideal parameter value. The threshold for these deviations may be determined by a user.

Figure 16:
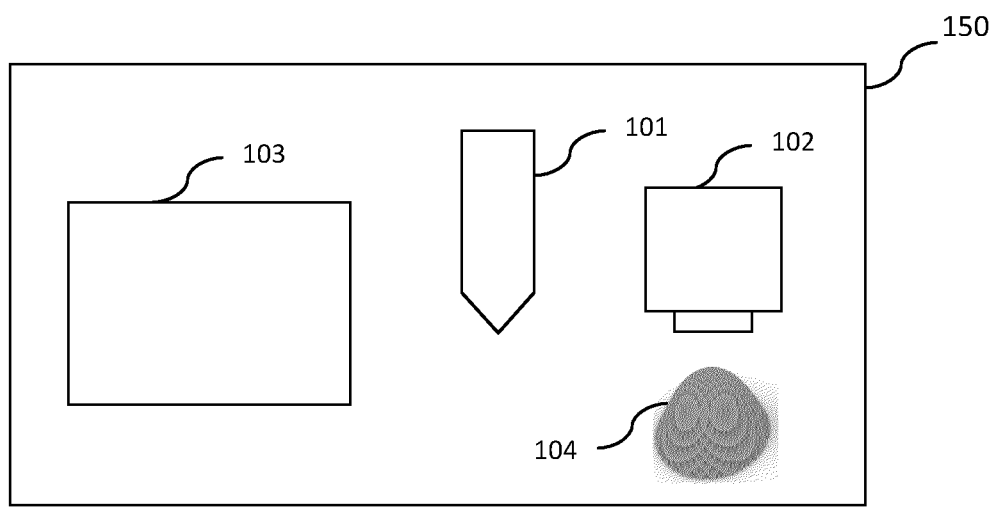
FIG. 16 shows an illustration of an arrangement 150 for forming the three-dimensional structure.

FIG. 16 shows an illustration of an arrangement 150 for forming the three-dimensional structure. The arrangement 150 may be configured to perform or carry out the methods described in connection with FIGS. 1A to 15B.

The arrangement 150 includes a device 101 for forming a three-dimensional structure 104 based on structural coordinate information relating the three-dimensional structure 104. The arrangement 100 further includes a moveable sensing device 102. The arrangement 100 further includes a processor 103. The processor 103 is configured to determine one or more locations for positioning the sensing device 102 based on structural coordinate information relating to a three-dimensional structure to be formed, and to control a positioning of the moveable sensing device 102 to the one or more locations.

The device 101 for forming the three-dimensional (3D) structure may process be stereolithography (SLA) device, a digital light processing (DLP) device, a fused deposition modeling (FDM) device, a selective laser sintering (SLS) device, a selective laser melting (SLM) device, an electronic beam melting (EBM) device, a laminated object manufacturing (LOM) device, a binder jetting (BJ) device, and/or a material jetting (MJ) device.

The sensing device 102 may be an imaging device, a camera, or a three-dimensional scanning device, a thermal camera, a digital microscope, an acoustic emission sensor and/or a CT-device, for example.

The processor 103 may be any a computer or a machine capable of executing instructions of a computer-readable storage medium. Such a computer-readable storage medium may include instructions which, when executed by the computer (or processor) 103, cause the computer 103 to carry out the method described in connection with FIGS. 1A to 15B.

The arrangement 150 may be a vision-based monitoring system for performing the method described in connection with FIGS. 1A to 15B. The sensing device 102 (e.g. a commercial digital microscope) may be configured to acquire the data (e.g. images) in a layer-wise manner. The acquired data may be processed for detecting defects. After a (or each) layer is printed, the sensing device 102 may be positioned by the printer's axes at the one or more locations. Depending on the field of view and the size of the monitored feature, one or more images may be taken and processed.

For the automation of camera positioning and image taking, the time of the image taking and the optimal camera position may need to be known. This information may be extracted from the numerical code, which includes all printer movements used to print the three-dimensional scaffold structure. The numerical code may be separated to determine potential camera positions and modified with commands for the camera positioning. Thus, the processor 103 may be configured to process structural coordinate information related to the layout and/or internal structure and/or external structure of the three-dimensional structure to be formed. The structural coordinate information may include CAD-based information or numerical code information, for example Based on the structural coordinate information, the processor 103 may be configured to generate adapted numerical code instructions for forming the three-dimensional structure 104. The adapted numerical code instructions may include structural coordinate information relating to a three-dimensional structure to be formed and information related to the positioning of the sensing device at the one or more locations.

The device 101, the moveable sensing device 102 and the processor 103 may be connected to each other, so that the portion of the device 101 whose movement is controlled by the numerical code instructions may be the portion of the device 101 (e.g. printing head, dispenser, nozzle head, an extruder, or laser) responsible for the forming of the three-dimensional structure at the selected locations defined by the structural coordinate information of the numerical code instructions.

The processor 103 may further be configured to determine a process status based on acquired data related to at least part of the formed portion of the three-dimensional structure. The acquired data may be acquired or generated by the sensing device 102 at the determined locations of the one or more locations.

It may be understood that in some embodiments, the arrangement 150 includes a forming device 101 for forming a three-dimensional structure including a plurality of layers. The arrangement 150 includes a moveable sensing device 102. The arrangement 150 includes a processor configured
(a) to determine, for a layer set of the plurality of layers, at least one location for positioning the sensing device,
(b) to control a forming of the layer set by the device based on structural coordinate information relating to the three-dimensional structure,
(c) to control a positioning of the moveable sensing device to at least one location associated with the layer set, after the layer set is formed and before a further layer set is formed, and
(d) to determine a process status based on acquired data of the formed layer set, wherein the acquired data is acquired by the sensing device at at least one location associated with formed layer set.

The various embodiments described herein may relate to a vision-based system for in situ defect detection during the additive manufacturing process of porous scaffolds. They provide a complete process of a defect detection system based on the measurement of the diameter of printed strands. Using a digital microscope with adjustable magnification as a sensor and vision-based data processing, small defects in the structure may be detected directly. The various concept may include automated camera positioning using numerical code as well as the processing of the taken images in which the diameters of printed strands are measured. The image processing may be implemented with at least two different edge detection methods, such as a gradient-based edge detection or an edge detection based on a CNN.

The various embodiments and examples may be integrated in an existing printing environment, wherein the monitored strands may be detected and measured. The various embodiments may provide one or more options for the analysis of the measurements. For example, based on the requirements of the quality control, the quality of single strands, layers or the overall structure may be examined.

The various embodiments may be implemented at different automation levels. It may be suitable for manual quality control. For example, the user may place the structure manually under the microscope and take images of the upper layer. The computer-executable instructions may be configured to draw the axes of strands to be measured manually by marking the start and end points of the axes. The strand may be measured by the computer-executable instructions and the output may be displayed and saved. In this case, no modification of the Numerical code is necessary. Optionally or alternatively, automation of the monitoring process may be carried out with automated camera positioning, image acquisition, and processing, but without a closed loop control. Herein, the user may have access to the status of the print at any time during and after the manufacturing process and may intervene if necessary. A fully automated closed loop system may also be implementable. In this case, the print may be running as long as the quality requirements are fulfilled, otherwise it is aborted, or printing parameters are adjusted automatically to compensate.

The various embodiments may be used for the monitoring of three-dimensional structures by any three-dimensional printing methods. In particular, the various embodiments may monitor the quality of FDM printed strands in porous scaffolds during the manufacturing process. The measuring of the strand diameter may be suitable for classifying and localizing defects and their sources. Manufacturers may be able to analyze the quality of printing objects in situ. FDM printed porous structures have become popular in tissue engineering applications, such as cell culture meshes and uniquely tailored implants. For scaffold fabrication, PCL may be used as a material because of its good rheological and viscoelastic properties. PCL has a good thermal stability, which makes it suitable for the FDM printing process. Especially for applications with a medical background, a sophisticated quality control process is demanded. Although sensors have become an essential component in manufacturing, FDM as one of the most popular 3D printing techniques lack monitoring systems as well as open loop control systems. The lack of sensing in AM processes makes in situ quality control quite challenging. Post-print quality control is also complicated since structures inside the printed part are difficult or impossible to access.

The methods and arrangements described in connection with FIGS. 1A to 16 may relate to a vision-based inspection process for the in-situ monitoring of additively manufactured porous scaffolds. The methods and arrangements may include evaluating the quality of the internal structure of printed scaffolds by monitoring their geometrical dimensions, for example. A commercial digital microscope with adjustable magnification may be used to capture selected internal regions of the printed object. The captured images may be analyzed with computer vision methods. At least one of two different edge detection techniques may be used for detecting boundaries in selected regions of the image. The first edge detection technique may include or may be a gradient based approach. The second edge detection technique may be based on the classification of a convolution neural network (CNN). The methods and arrangements may include the use of automated camera positioning, which may be based on and/or controlled by the separation and modification of the numerical code.

Structures to be formed such as breast implants (e.g. biodegradable) and/or cell culture meshes may be monitored during their manufacturing process. The methods may be integrated at various stages of a quality control process. It may be part of a closed loop system which automatically compensates the defects or may stop the manufacturing process if a significant defect occurs.

Sensors may be used in manufacturing processes to achieve better process reliability, repeatability and automation of the process. Desirable effects of monitoring the printing process: to detect errors while printing; to avoid further failures by adjusting printing parameters; to automatically stop the printing process if the detected error is significant; and to detect errors difficult to monitor in the manufactured product (e.g. defects of internal features). This effectively saves printing time, reduces material waste and improves quality control and documentation of the manufacturing process.

The various embodiments described herein may relate to in-situ monitoring of printed (e.g. FDM printed) porous structures. Existing techniques relate mainly to solid printing objects as they monitor the dimensions of the outer boundary rather than internal structures. In general, existing techniques do not reach a resolution of less than one millimeter. The quality and the mechanical properties of porous structures is scientifically affected by the appearance of the internal structure, hence the various embodiments described herein relate to monitoring systems, methods and arrangements that may also monitor the internal structure. To get a meaningful evaluation of printing quality, measurements in sub-millimeter range may be pursued.

In some embodiments, numerical code may be used to obtain the ideal structure of the printing object as a reference instead of using CAD data. In such embodiments, no CAD program is used. Using numerical code to get a representation of the ideal appearance is possible, since all machine movements and the diameters of the printing strands are known by the code.

The various embodiments described herein may relate to the monitoring of strand diameters. A quality property of the manufactured structures is the dimension of the printed strands. A high-quality product may be characterized by a consistent strand diameter of a specified value. The consistency of the strand diameter may also indicate that the printing process is stable and reliable. On the other hand, inconsistent strand diameters and deviations from the demanded strand diameter suggest an unsteady manufacturing process. Therefore, monitoring the strand diameter during printing may allow not only a reliable in-situ quality control but also the optimization of the manufacturing process. For tissue engineering, the strand diameter may be an important variable because diameters deviations change the pore size which may prevent proper tissue growth, and may also change mechanical properties.

The invention is further characterized by the following items.

Item 1: A method for forming a three-dimensional structure, the method including:
  determining one or more locations for positioning a sensing device based on structural coordinate information relating to a three-dimensional structure to be formed;
  forming a portion of the three-dimensional structure based on the structural coordinate information; and
  positioning the sensing device at a location of the one or more locations, Item 2: The method of item 1, wherein the structural coordinate information includes information relating to a layout of the three-dimensional structure.

Item 3: The method of item 1 or 2, wherein the structural coordinate information includes information related to an internal structure of the three-dimensional structure.

Item 4: The method of any of items 2 or 3, wherein the structural coordinate information includes toolpath instructions for controlling a forming device for forming the three-dimensional structure.

Item 5: The method of any of items 1 to 4, further comprising determining a process status based on acquired data relating to at least part of the formed portion of the three-dimensional structure, wherein the acquired data is acquired by the sensing device at the determined location.

Item 6: The method of item 5, wherein determining the process status includes determining a parameter value of a structural feature of the formed portion of the three-dimensional structure based on the acquired data.

Item 7: The method of item 6, wherein the parameter value is at least one of a length, width or diameter, height, roughness, color, homogeneity, thickness and tilt angle of the structural feature of the formed portion of the three-dimensional structure.

Item 8: The method of item 6 or 7, wherein the structural feature includes a strand segment of an internal structure of the three-dimensional structure.

Item 9: The method of item 8, wherein the parameter value of the feature is determined by detecting edges of the strand segment.

Item 10: The method of item 9, wherein the edges of the strand segment are detected by implementing an artificial neural network process or a gradient-based detection process.

Item 11: The method of any of items 5 to 9, wherein determining the process status includes
  determining, based on the structural coordinate information, an ideal axis of a strand segment of the portion of the three-dimensional structure;
  determining, based on the acquired data of the formed portion, an actual axis of a strand segment of the formed portion; and
  determining the process status based on a comparison between the ideal axis and the actual axis.

Item 12: The method of item 11, including determining a defective process status if a difference between the ideal axis and the actual axis exceeds a threshold.

Item 13: The method of any of items 5 to 12, wherein determining the process status includes
  comparing an ideal parameter value of a strand segment of the portion of the three-dimensional structure and a determined parameter value of a strand segment of the formed portion,
  wherein the determined parameter value of the strand segment is determined based on the acquired data of at least part of the formed portion of the three-dimensional structure, and
  wherein the ideal parameter value of the strand segment is determined based on at least one of the structural coordinate information and an input value.

Item 14: The method of any of items 5 to 13, including determining a defective process status if a difference between the ideal parameter value and the determined parameter value exceeds a threshold.

Item 15: The method of any of items 5 to 14, wherein determining the process status includes
  determining a plurality of parameter values associated with a plurality of strand segments of the formed portion;
  determining a statistical parameter of the plurality of parameter values, and
  determining a defective process status if a difference between the statistical parameter and a comparative parameter exceeds a threshold.

Item 16: The method of any of items 1 to 15, further including adapting process parameters for forming the three-dimensional structure based on the determined process status.

Item 17: The method of any items 1 to 16, wherein the portion of the three-dimensional structure includes a layer set of a plurality of layers of the three-dimensional structure Item 18: The method of item 17, further including
  determining, for a layer set of the plurality of layers, a respective group of locations for positioning the sensing device,
  forming a layer set of the plurality of layer sets; and
  after forming the layer set and before forming a subsequent layer set, sequentially positioning the sensing device at the locations of the group of locations, and at each location, acquiring data of the formed layer set.

Item 19: The method of item 17 or 18, wherein a layer set includes at least a first sub-layer and at least a second sub-layer;
  wherein the locations of the plurality of locations are determined based on intersection points between the first sub-layer and the second sub-layer.

Item 20: The method of item 18 or 19, wherein the locations of the plurality of locations are between two intersection points of the first sub-layer and the second sub-layer.

Item 21: The method of any of items 1 to 20, wherein the one or more locations includes a number of locations, wherein the number of locations is random, sequential, array-based or determinable by a user.

Item 22: The method of any of items 17 to 21, wherein the method includes
  repeatedly alternatingly between
    forming a layer set of the plurality of layer sets; and
    after forming the layer set and before forming a further layer set, sequentially positioning the sensing device at the locations of the group of locations of the layer set.

Item 23: Computer-readable storage medium including instructions which, when executed by a computer, cause the computer to carry out the method of any of items 1 to 22.

Item 24: An arrangement for forming a three-dimensional structure, the arrangement including:
  a forming device for forming a three-dimensional structure based on structural coordinate information relating the three-dimensional structure;
  a moveable sensing device; and
  a processor,
  wherein the processor is configured
    to determine one or more locations for positioning the sensing device based on structural coordinate information relating to a three-dimensional structure to be formed, and
    to control a positioning of the moveable sensing device to the one or more locations.

Item 25: The arrangement of item 24, wherein the processor is further configured to generate adapted numerical code instructions for forming the three-dimensional structure, wherein the adapted numerical code instructions comprises structural coordinate information relating to a three-dimensional structure to be formed and information related to the positioning of the sensing device at the one or more locations.

Item 26: The arrangement of item 24, wherein the processor is further configured to determine a process status based on acquired data related to at least part of the formed portion of the three-dimensional structure, wherein the acquired data is acquired by the sensing device at a location of the one or more locations.

Item 27: An arrangement for forming a three-dimensional structure, the arrangement including:
   a forming device for forming a three-dimensional structure including a plurality of layers;
   a moveable sensing device;
   a processor configured
      to determine, for a layer set of the plurality of layers, at least one location for positioning the sensing device,
      to control a forming of the layer set by the device based on structural coordinate information relating to the three-dimensional structure,
      to control a positioning of the moveable sensing device to at least one location associated with the layer set, after the layer set is formed and before a further layer set is formed, and
      to determine a process status based on acquired data of the formed layer set, wherein the acquired data is acquired by the sensing device at the at least one location associated with formed layer set.

Having described in detail embodiments of the present invention, it is understood that the invention defined by the appended claims is not to be limited by particular details set forth in the above description, as many apparent variations thereof are possible without departing from the spirit or scope thereof

What is claimed is:

1. A method for forming a three-dimensional structure, the method including:
   determining one or more locations for positioning a sensing device based on structural coordinate information relating to a layout of strands of the three-dimensional structure to be formed;
   forming a portion of the three-dimensional structure based on the structural coordinate information;
   positioning the sensing device at a location of the one or more locations; and
   determining a process status based on acquired data relating to at least part of the formed portion of the three-dimensional structure, wherein the acquired data is acquired by the sensing device at a location of the one or more determined locations.

2. The method of claim 1, wherein the structural coordinate information includes information related to an internal structure of the three-dimensional structure.

3. The method of claim 1, wherein the structural coordinate information includes toolpath instructions for controlling a forming device for forming the three-dimensional structure.

4. The method of claim 1, wherein determining the process status includes determining a parameter value of a structural feature of the formed portion of the three-dimensional structure based on the acquired data.

5. The method of claim 4, wherein the parameter value is at least one of a length, width or diameter, height, roughness, color, homogeneity, thickness, and tilt angle of the structural feature of the formed portion of the three-dimensional structure.

6. The method of claim 4, wherein the structural feature includes a strand segment of an internal structure of the three-dimensional structure.

7. The method of claim 6, wherein the parameter value of the feature is determined by detecting edges of the strand segment.

8. The method of claim 7, wherein the edges of the strand segment are detected by implementing an artificial neural network process or a gradient-based detection process.

9. The method of claim 1, wherein determining the process status includes:
   determining, based on the structural coordinate information, an ideal axis for a strand segment of the portion of the three-dimensional structure;
   determining, based on the acquired data, an actual axis of a strand segment of the formed portion; and
   determining the process status based on a comparison between the ideal axis and the actual axis.

10. The method of claim 9, including determining a defective process status if a difference between the ideal axis and the actual axis exceeds a threshold.

11. The method of claim 1, wherein determining the process status includes:
   comparing an ideal parameter value for a strand segment of the portion of the three-dimensional structure and a determined parameter value of a strand segment of the formed portion,
   wherein the determined parameter value of the strand segment is determined based on the acquired data, and
   wherein the ideal parameter value of the strand segment is determined based on at least one of the structural coordinate information and an input value.

12. The method of claim 11, including determining a defective process status if a difference between the ideal parameter value and the determined parameter value exceeds a threshold.

13. The method of claim 1, wherein determining the process status includes:
   determining a plurality of parameter values associated with a plurality of strand segments of the formed portion;
   determining a statistical parameter of the plurality of parameter values; and
   determining a defective process status if a difference between the statistical parameter and a comparative parameter corresponding thereto exceeds a threshold.

14. The method of claim 1, further including adapting process parameters for forming the three-dimensional structure based on the determined process status.

15. The method of claim 1, wherein the portion of the three-dimensional structure includes a layer set of a plurality of layers of the three-dimensional structure.

16. The method of claim 15, further including:
   determining, for a layer set of the plurality of layers, a respective group of locations for positioning the sensing device;
   forming the layer set of the plurality of layers; and
   after forming the layer set and before forming a subsequent layer set of the plurality of layers, sequentially positioning the sensing device at locations of the group of locations, and at each of said locations, acquiring data of the formed layer set.

17. The method of claim 15, wherein the layer set includes at least a first sub-layer and at least a second sub-layer, and
   wherein the one or more locations are determined based on intersection points between the first sub-layer and the second sub-layer.

18. An arrangement for forming a three-dimensional structure, the arrangement including:
- a forming device for forming a three-dimensional structure based on structural coordinate information relating to the three-dimensional structure;
- a moveable sensing device; and
- a processor,
- wherein the processor is configured:
  - to determine one or more locations for positioning the sensing device based on structural coordinate information relating to a layout of strands of the three-dimensional structure to be formed,
  - to control a positioning of the moveable sensing device to the one or more locations, and
  - to determine a process status based on acquired data related to at least part of formed portions of the three-dimensional structure, wherein the acquired data is acquired by the sensing device at a location of the one or more locations.

19. An arrangement for forming a three-dimensional structure, the arrangement including:
- a forming device for forming a three-dimensional structure including a plurality of layers;
- a moveable sensing device;
- a processor configured:
  - to determine, for a layer set of the plurality of layers, at least one location for positioning the sensing device based on structural coordinate information relating to a layout of strands of the three-dimensional structure to be formed,
  - to control a forming of the layer set by the forming device based on structural coordinate information relating to the three-dimensional structure,
  - to control a positioning of the moveable sensing device to at least one location associated with the layer set, after the layer set is formed and before a further layer set of the plurality of layers is formed, and
  - to determine a process status based on acquired data of the formed layer set, wherein the acquired data is acquired by the sensing device at the at least one location associated with formed layer set.

20. A computer-readable storage medium including instructions which, when executed by the processor of the arrangement of claim 18, cause the arrangement to carry out a method for forming a three-dimensional structure, the method including:
- determining the one or more locations for positioning the sensing device based on structural coordinate information relating to the layout of strands of the three-dimensional structure to be formed;
- forming a portion of the three-dimensional structure based on the structural coordinate information;
- positioning the sensing device at a location of the one or more locations; and
- determining the process status based on acquired data relating to at least part of the formed portion of the three-dimensional structure, wherein the acquired data is acquired by the sensing device at a location of the one or more determined locations.

\* \* \* \* \*